(12) United States Patent  (10) Patent No.: US 8,170,407 B2
Kurokawa et al.  (45) Date of Patent: May 1, 2012

(54) HOUSING STRUCTURE AND ELECTRONIC DEVICE

(75) Inventors: Tomoyasu Kurokawa, Kokubunji (JP); Takayuki Satou, Uenohara (JP)

(73) Assignee: Casio Computer Co., Ltd., Tokyo (JP)

( * ) Notice: Subject to any disclaimer, the term of this patent is extended or adjusted under 35 U.S.C. 154(b) by 7 days.

(21) Appl. No.: 12/912,959

(22) Filed: Oct. 27, 2010

(65) Prior Publication Data
US 2011/0097070 A1  Apr. 28, 2011

(30) Foreign Application Priority Data

Oct. 27, 2009 (JP) ................................. 2009-245999
Oct. 30, 2009 (JP) ................................. 2009-250197
Oct. 30, 2009 (JP) ................................. 2009-250222

(51) Int. Cl.
*G03B 17/08* (2006.01)
(52) U.S. Cl. ........................................................ 396/29
(58) Field of Classification Search .................. 396/25, 396/27, 29; 348/81
See application file for complete search history.

(56) References Cited

U.S. PATENT DOCUMENTS

| | | | | |
|---|---|---|---|---|
| 4,289,392 | A * | 9/1981 | Kobori et al. | 396/386 |
| 5,285,894 | A * | 2/1994 | Kamata et al. | 206/316.1 |
| 6,650,355 | B2 | 11/2003 | Sasaki | |
| 7,494,345 | B2 | 2/2009 | Saiki | |
| 7,609,996 | B2 | 10/2009 | Yamaguchi | |
| 7,751,696 | B2 * | 7/2010 | Tatamiya | 396/25 |
| 7,949,242 | B2 * | 5/2011 | Yang et al. | 396/29 |
| 2003/0128973 | A1 * | 7/2003 | Shinohara et al. | 396/25 |
| 2005/0220448 | A1 * | 10/2005 | Tei et al. | 396/25 |
| 2008/0139012 | A1 | 6/2008 | Saiki | |
| 2011/0097070 | A1 * | 4/2011 | Kurokawa et al. | 396/448 |

FOREIGN PATENT DOCUMENTS

| | | |
|---|---|---|
| JP | 3-094531 U | 9/1991 |
| JP | 5-188457 A | 7/1993 |
| JP | 7-005552 A | 1/1995 |
| JP | 2001-199125 A | 7/2001 |
| JP | 2002-023234 A | 1/2002 |

(Continued)

OTHER PUBLICATIONS

Japanese Office Action dated Jul. 12, 2011 (and English translation thereof) in counterpart Japanese Application No. 2009-250222.
Japanese Office Action dated Aug. 9, 2011 (and English translation thereof) in counterpart Japanese Application No. 2009-250197.

(Continued)

*Primary Examiner* — Wi. B. Perkey
(74) *Attorney, Agent, or Firm* — Holtz, Holtz, Goodman & Chick, PC

(57) ABSTRACT

A structure of a housing mounted with a lens unit is provided that is capable of withstanding internal pressure changes and ensures shock-resistance while being waterproof and thin. This structure for a housing includes a lens unit 8 that is mounted in housings 3 and 4, a porous film 11 that is attached to the inner surface toward a ventilation hole 31 formed in the housing 3, an elastic member 9 that is interposed between the lens unit 8 and the porous film 11, and a shock-absorbing member 10 that is interposed between the housings 3 and 4 and the lens unit 8. The elastic member 9 is a lens holder that is interposed between the porous film 11 and a portion of the shock-absorbing member 10, and has a through-hole 91 in an area corresponding to the ventilation hole 31 in the housing 3.

13 Claims, 32 Drawing Sheets

FOREIGN PATENT DOCUMENTS

| | | |
|---|---|---|
| JP | 2004-070657 A | 3/2004 |
| JP | 2004-157240 A | 6/2004 |
| JP | 2006-186738 A | 7/2006 |
| JP | 2007-034123 A | 2/2007 |
| JP | 2008-116798 A | 5/2008 |
| JP | 2008-171805 A | 7/2008 |

OTHER PUBLICATIONS

Japanese Office Action (Notification of Reason(s) for Rejection) dated May 24, 2011 (and English translation thereof) in counterpart Japanese Application No. 2009-245999.

* cited by examiner

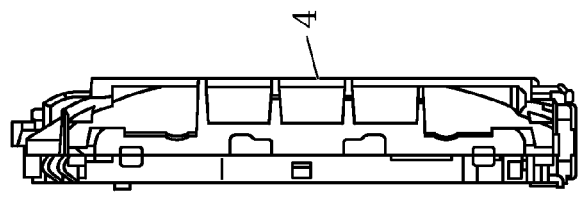
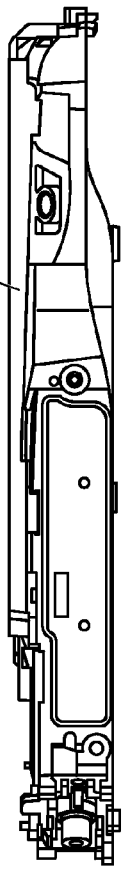
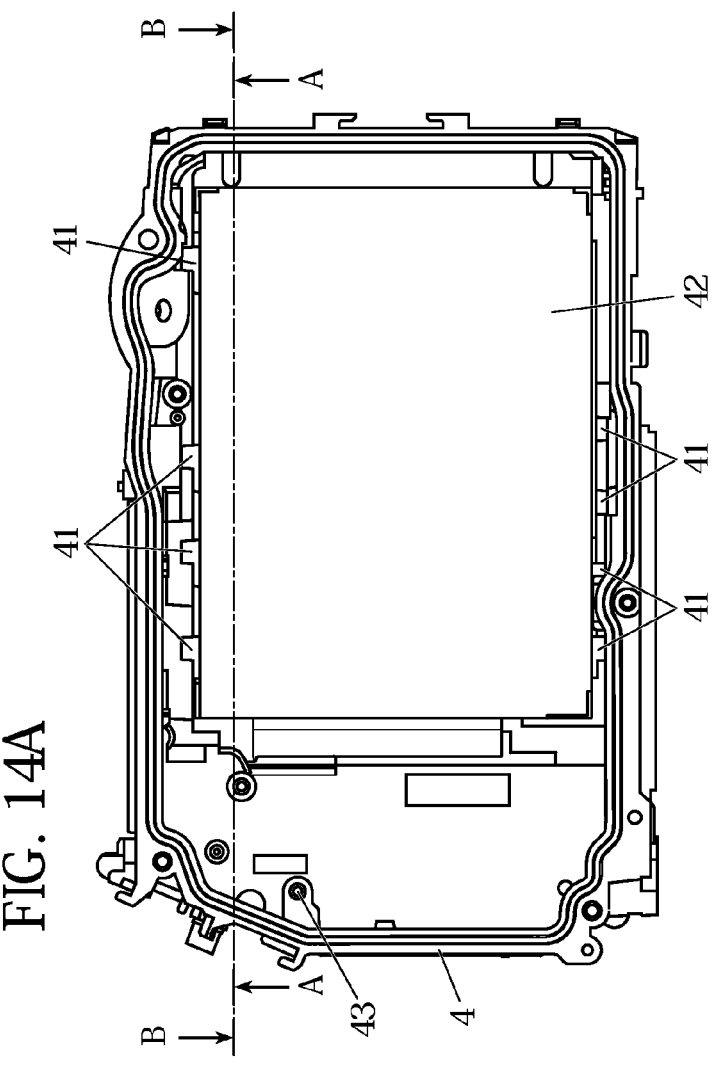

FIG. 17A
FIG. 17B
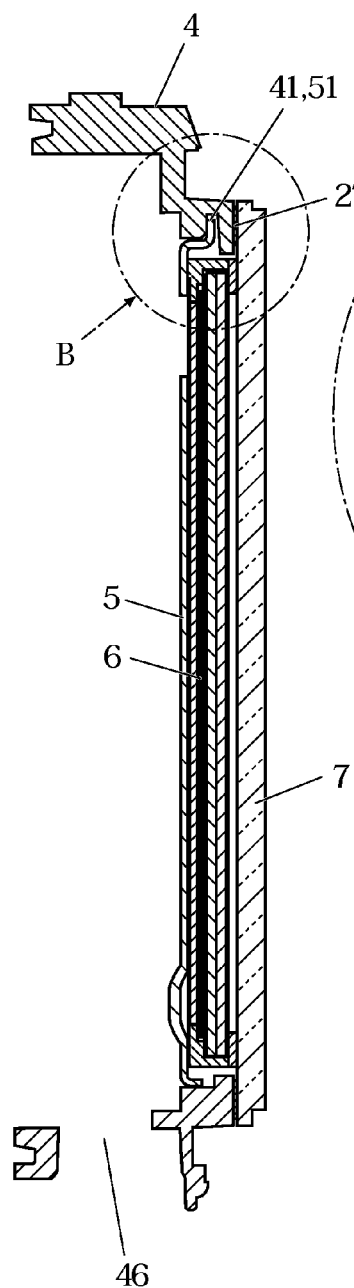
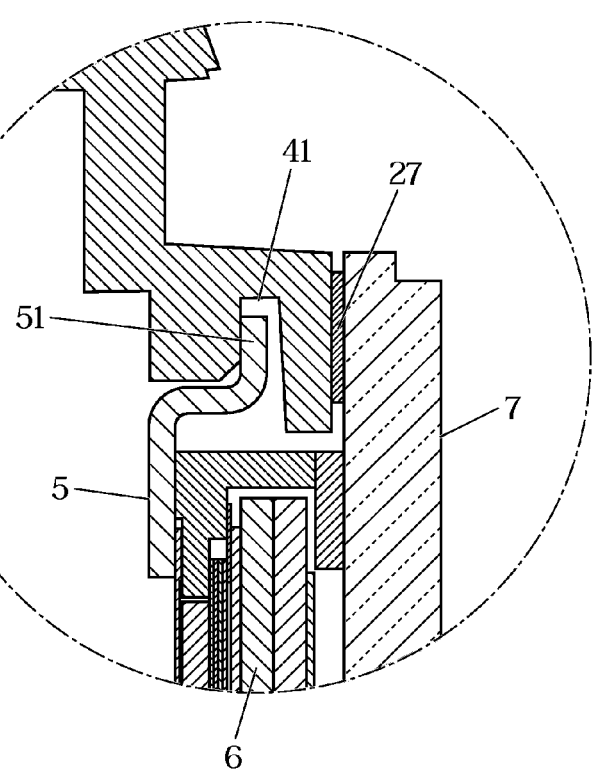

FIG. 23
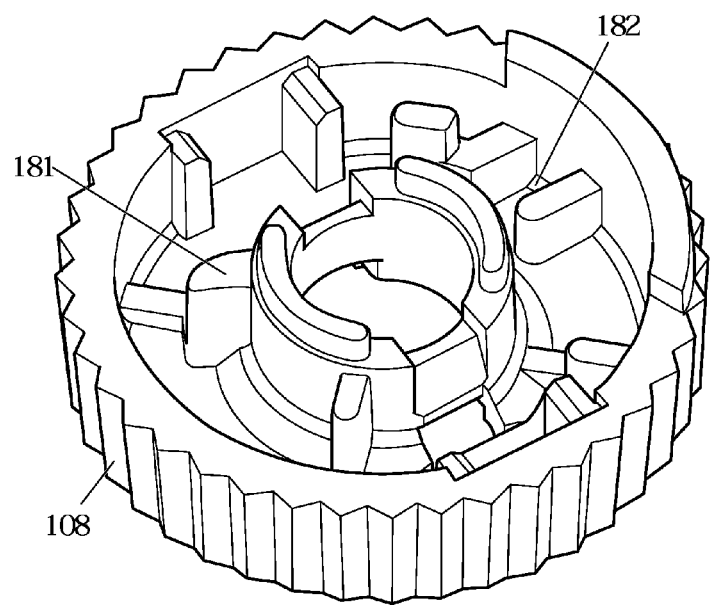
FIG. 24A    FIG. 24B    FIG. 24C
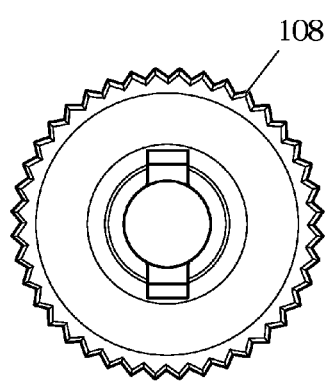 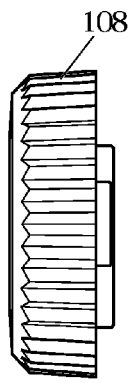 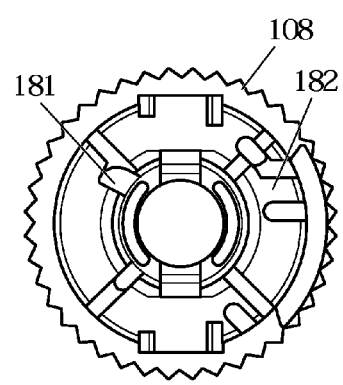

FIG. 26A
FIG. 26B
FIG. 26C
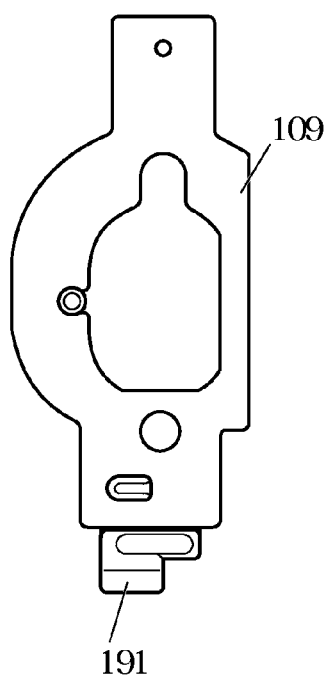
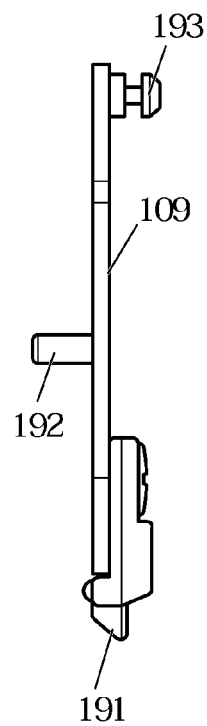
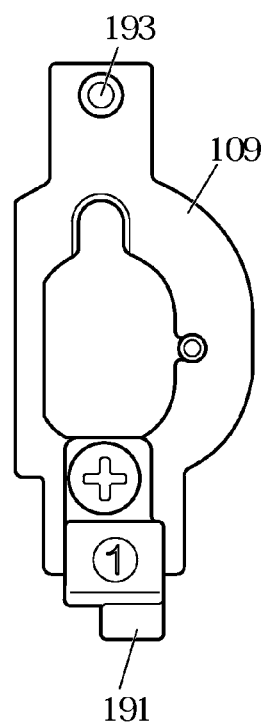

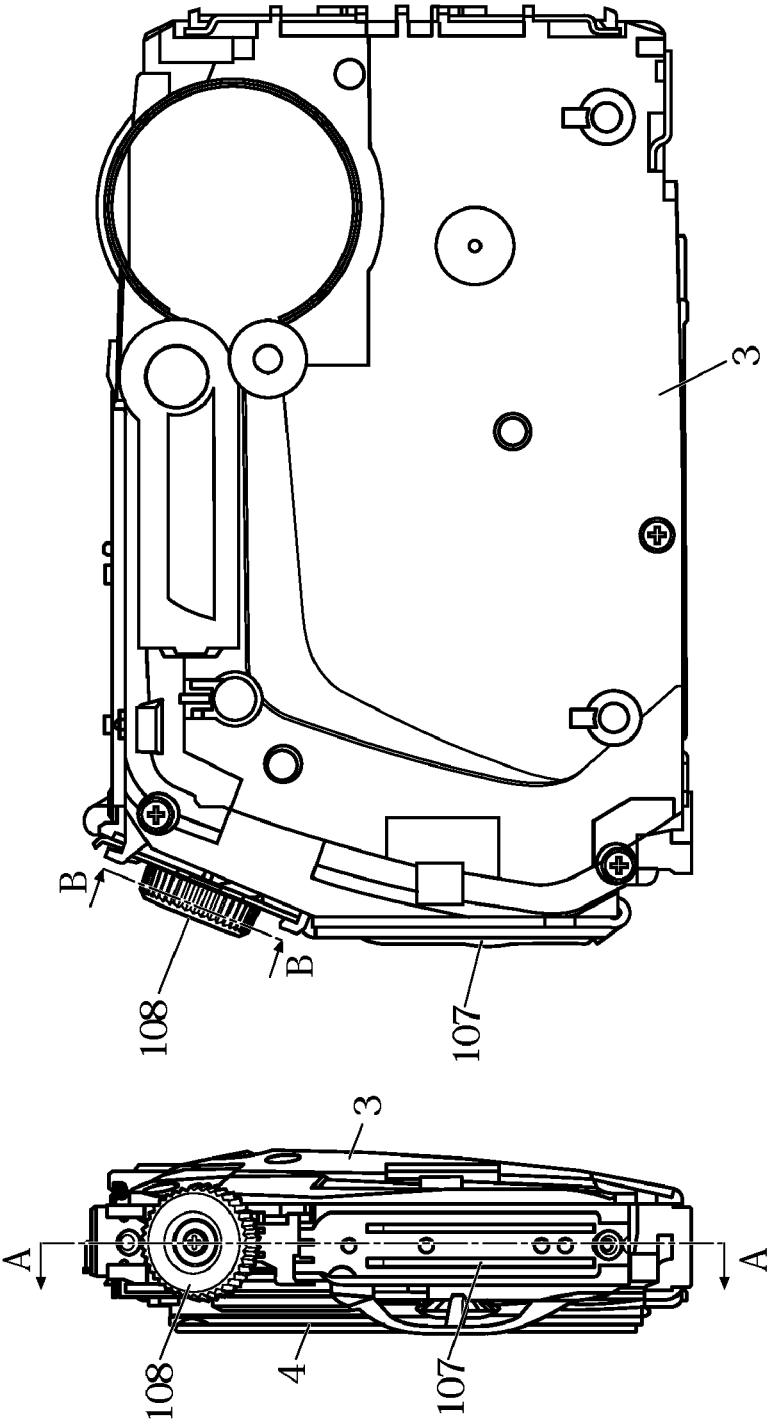

HOUSING STRUCTURE AND ELECTRONIC DEVICE

CROSS-REFERENCE TO RELATED APPLICATIONS

This application is based upon and claims the benefit of priority from the prior Japanese Patent Applications No. 2009-245999 filed Oct. 27, 2009, No. 2009-250197 filed Oct. 30, 2009 and No. 2009-250222 filed Oct. 30, 2009, the entire contents of which are incorporated herein by reference.

BACKGROUND OF THE INVENTION

1. Field of the Invention

The present invention relates to a structure for a housing mounted with a lens unit, and an electronic device having a housing with this structure.

2. Description of the Related Art

A waterproof camera whose housing is mounted with a lens unit is known.

In an electronic device having a waterproof housing, ensuring its airtightness is considered to be important. However, on the other hand, no consideration is given to air expansion in the housing caused by heat generation of the electrical circuit resulting from the prolonged use of the electronic device. Therefore, a problem of the housing being deformed or damaged by the air expansion can be expected to occur.

An object of the present invention is to provide a structure that is capable of withstanding internal pressure changes accompanying heat generation caused by its prolonged use and ensures shock-resistance, while maintaining waterproof performance.

SUMMARY OF THE INVENTION

In accordance with one aspect of the present invention, there is provided a housing structure comprising: a lens unit that is mounted in a housing; a porous film that is attached to an inner surface toward a ventilation hole formed in the housing; and an elastic member that is interposed between the lens unit and the porous film.

In accordance with another aspect of the present invention, there is provided an electronic device having a housing with the above-described structure.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 14A is a front view of the rear case in FIG. 3;

FIG. 14B is a top view of the rear case in FIG. 3;

FIG. 14C is a side view of the rear case in FIG. 3;

FIG. 17A is a cross-sectional view taken along the arrow A-A line in FIG. 16B:

FIG. 17B is an enlarged view of the arrow B area in FIG. 17A;

FIG. 23 is an enlarged view of the dial in FIG. 22 viewed from behind;

FIG. 24A is a front view of the dial;

FIG. 24B is a side view of the dial;

FIG. 24C is a rear view of the dial;

FIG. 26A is a front view of the sliding member;

FIG. 26B is a side view of the sliding member;

FIG. 26C is a rear view of the sliding member;

FIG. 27A is a front view of the housing in FIG. 2;

FIG. 27B is a side view of the housing in FIG. 2;

DETAILED DESCRIPTION OF THE PREFERRED EMBODIMENTS

The present invention will hereinafter be described in detail with reference to the preferred embodiments shown in the accompanying drawings.

Embodiment

Figure 1:
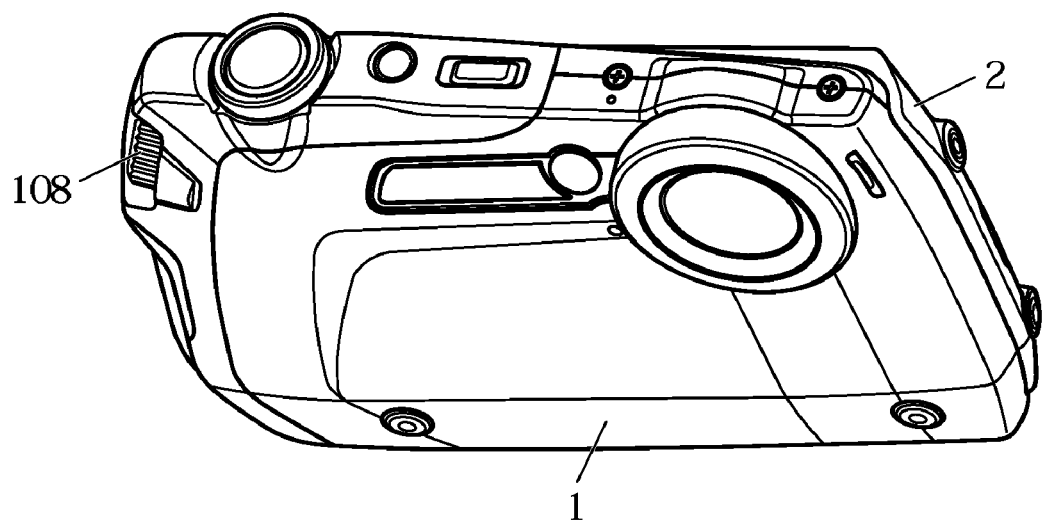
FIG. 1 is a perspective view showing a configuration of a first embodiment where the present invention has been applied to an electronic device, in which outer panels and the like of a waterproof camera have been attached to the electronic device.
Figure 2:
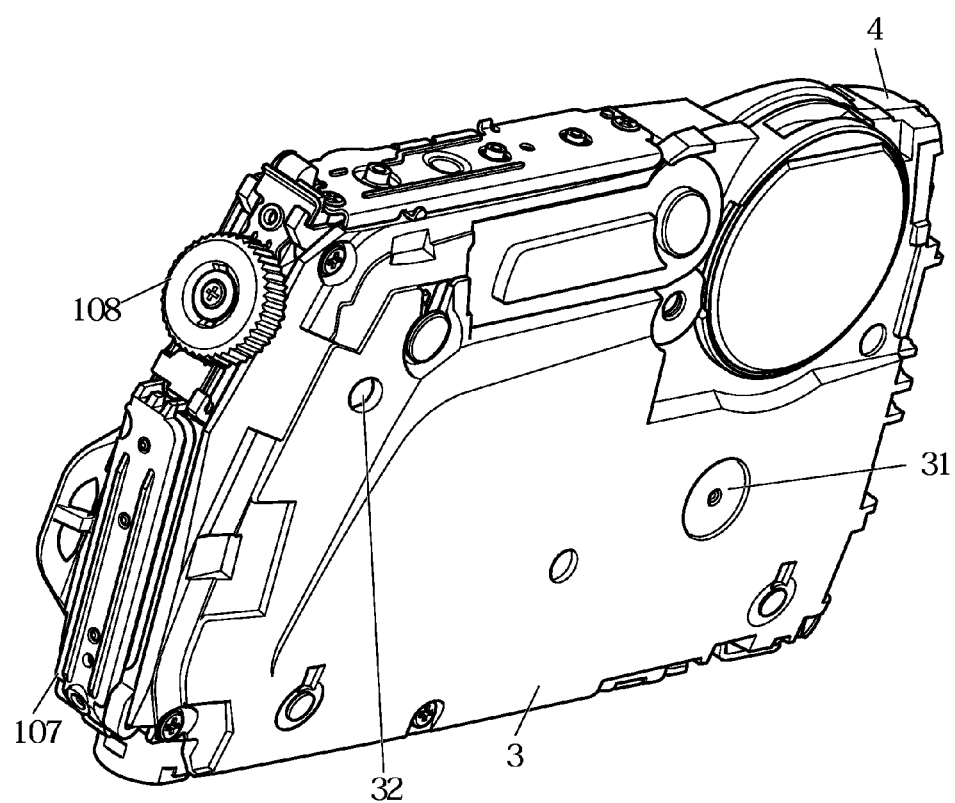
FIG. 2 is a diagram showing the housing of the electronic device, in which the outer panels and the like in FIG. 1 have been removed.

FIG. 1 and FIG. 2 show a waterproof camera for describing a configuration of an embodiment where the present invention has been applied to an electronic device. Reference numeral 1 represents a front panel, reference numeral 2 represents a rear panel, reference numeral 3 represents a front case, and reference numeral 4 represents a rear case.

In the embodiment, the front case 3 and the rear case 4 are made of resin, and when the front panel 1, the rear panel 2, and the like shown in FIG. 1 that serve as the exterior of the waterproof camera are removed, a housing constituted by these cases and the like shown in FIG. 2 is exposed.

In FIG. 1 and FIG. 2, reference numeral 31 represents a ventilation hole for adjusting internal pressure formed in the front case 3 (described in detail hereafter).

In addition, reference numeral 32 represents a hole for running the ground (earth) of a circuit board in the electronic device directly to the outer panel (front panel 1) (described in detail hereafter).

Moreover, reference numeral 107 represents a cover member configuring a cover that covers a media card slot and the like provided on a side surface of the electronic device (described in detail hereafter).

Reference numeral 108 represents a dial that is used to restrict the movement of the cover member 107 or to release this restriction by being rotated (described in detail hereafter).

Figure 3:
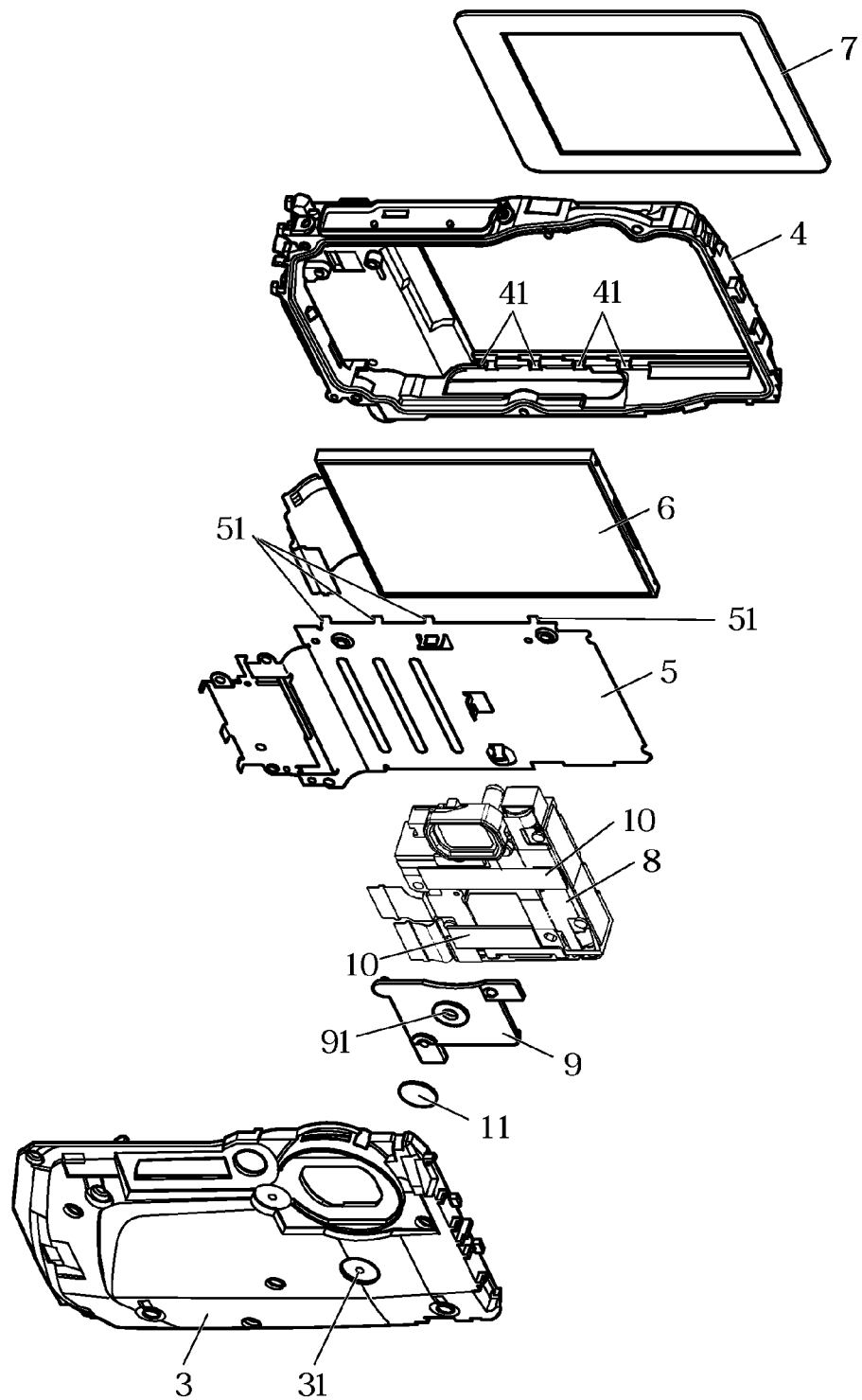
FIG. 3 is an exploded diagram showing components of the housing in FIG. 2, and internal components thereof.

FIG. 3 is an exploded diagram showing components of the housing, internal components thereof, and the like. Reference numeral 5 represents a metal frame, and reference numeral 6 represents a liquid crystal display (LCD) unit. In addition, reference numeral 7 represents a display plate, and reference numeral 8 represents a lens unit. Moreover, reference numeral 9 represents a lens holder (elastic member), and reference numeral 11 represents a porous film.

That is, the metal frame 5 and the LCD unit 6 are incorporated in the rear case 4, and the acrylic display plate 7 is attached on the outer surface of the rear case 4. The lens unit 8 is housed between the metal frame 5 and the front case 3, and the lens holder 9 made of an elastic member (elastomer) and the porous film 11 are provided between the lens unit 8 and the front case 3.

<Mounting of a Lens Unit Section>

Figure 4:
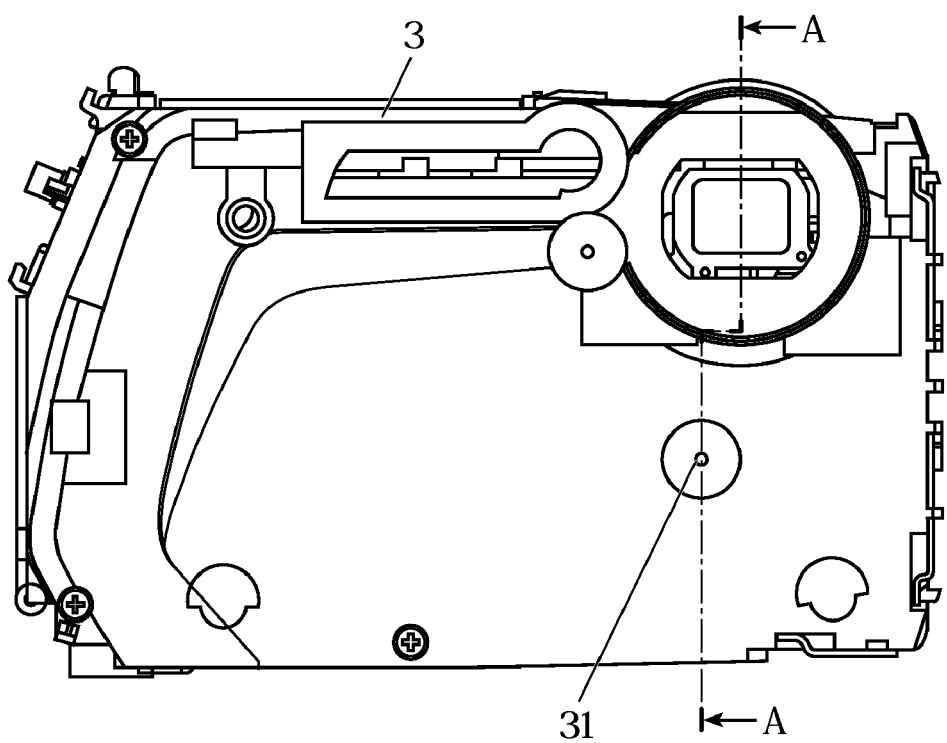
FIG. 4 is an enlarged front view of the housing in FIG. 2.
Figure 5:
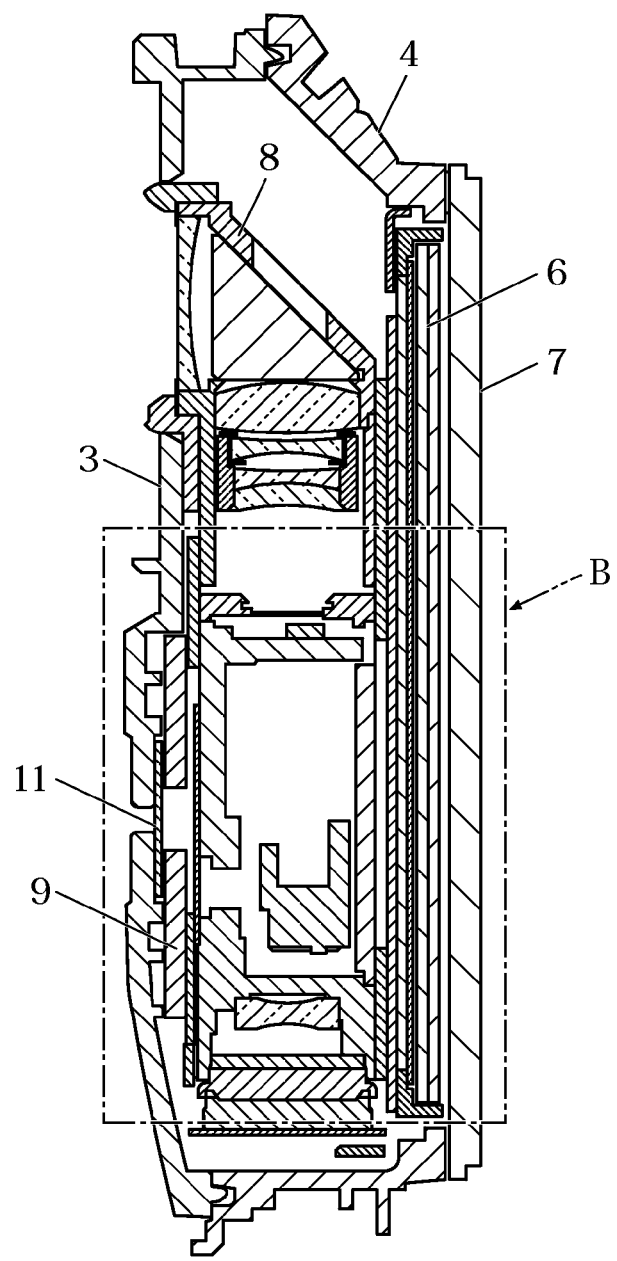
FIG. 5 is a cross-sectional view taken along the arrow A-A line in FIG. 4.
Figure 6:
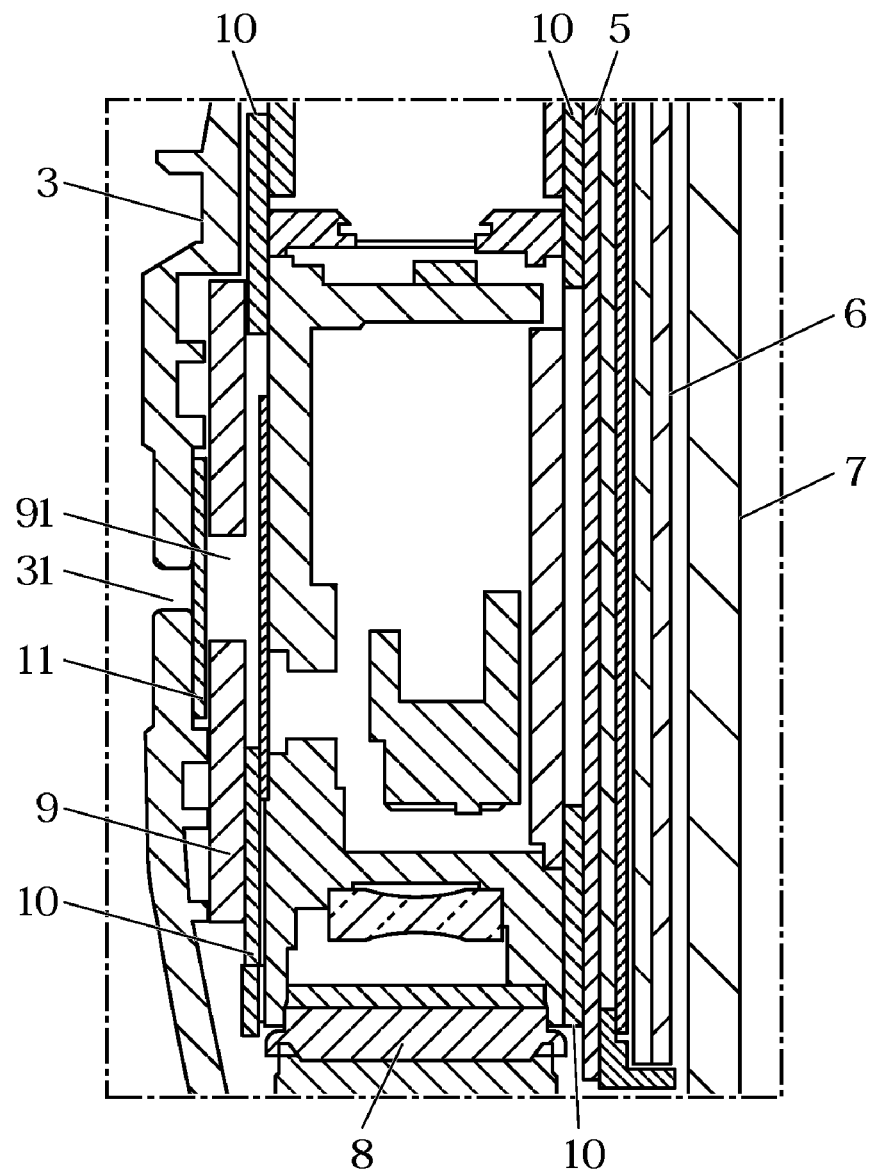
FIG. 6 is an enlarged view of the arrow B area in FIG. 5.

FIG. 4 is an enlarged front view of the front case 3, and FIG. 5 is a cross-sectional view taken along the arrow A-A line. FIG. 6 is an enlarged view of the arrow B area. Reference numeral 10 represents a shock-absorbing member made of a gel-like material.

As shown in the FIG. 4, FIG. 5, and FIG. 6, in the lens unit 8, a lens group for capturing images is incorporated in a case. In order to improve shock-absorption for external impact caused by dropping and the like, two upper and lower shock-absorbing members 10 are interposed between the front surface section of the lens unit 8 and the front case 3, and two other upper and lower shock-absorbing members 10 are interposed between the back surface section of the lens unit 8 and the metal frame 5, respectively. These shock-absorbing members 10 are respectively attached to the front surface section and the back surface section of the lens unit 8.

Also, in order to prevent the backlash of the lens unit 8, the lens holder 9 made of an elastomer elastic member is interposed between the upper and lower shock-absorbing members 10 attached to the front surface section of the lens unit 8 and the front case 3. This lens holder 9 has a through-hole 91 that corresponds to the ventilation hole 31 for adjusting internal pressure formed in the front case 3.

Figure 7:
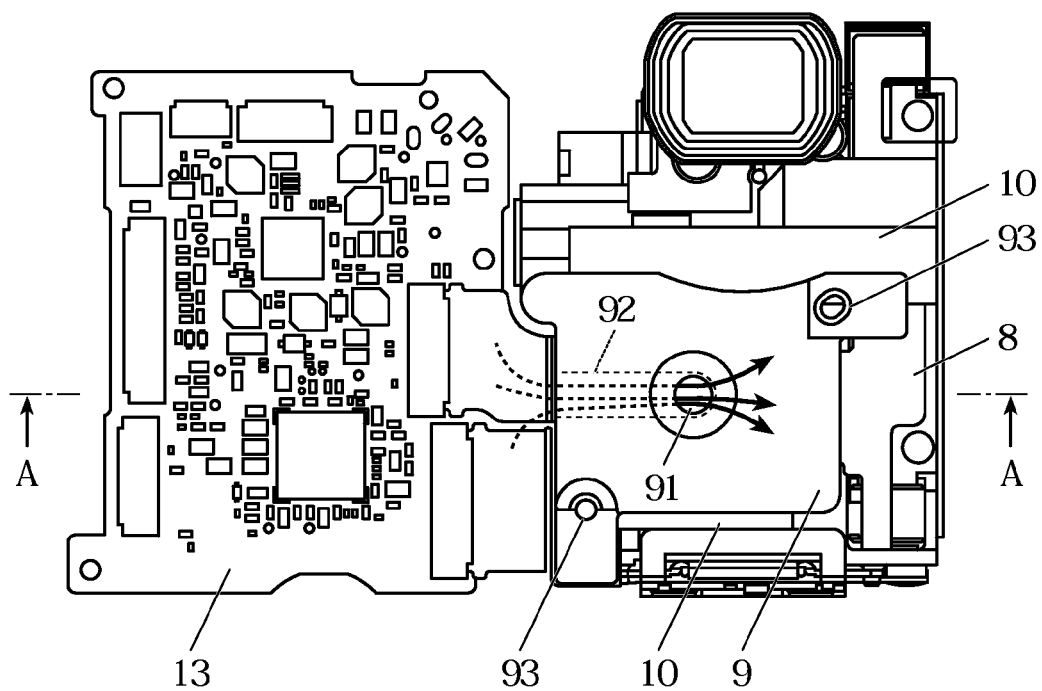
FIG. 7 is a front view of the lens unit, main substrate, and lens holder in FIG. 3 being assembled.
Figure 8:
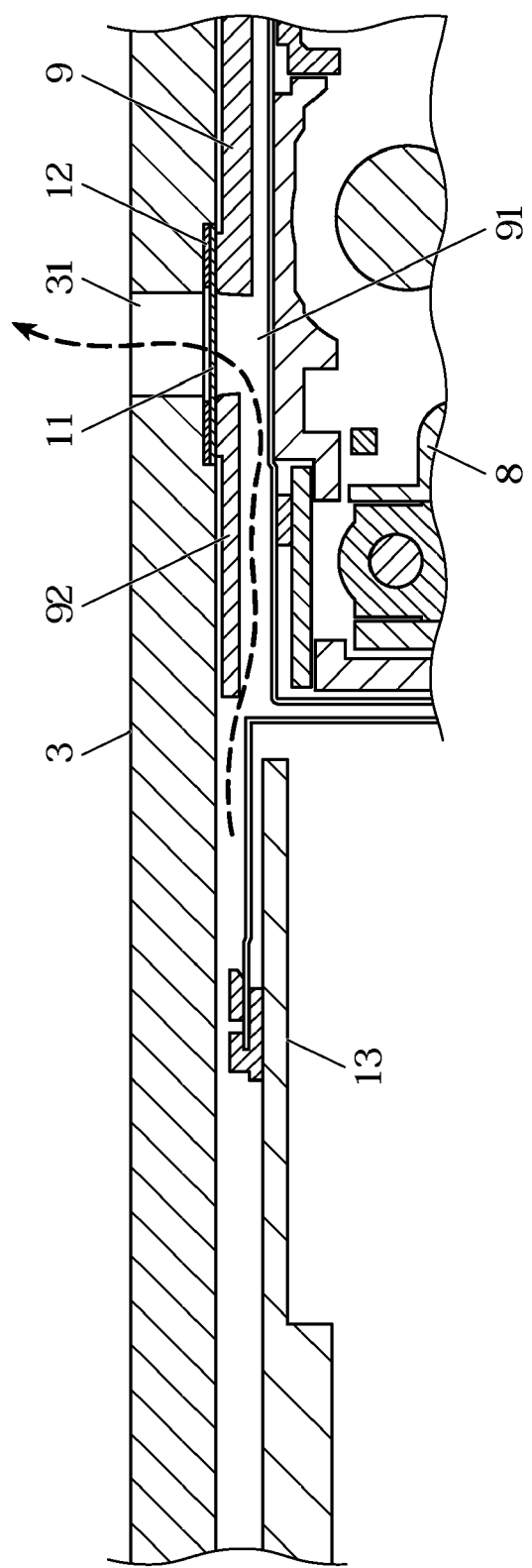
FIG. 8 is an enlarged cross-sectional view taken along the arrow A-A line in FIG. 7.

FIG. 7 is a diagram of the lens unit 8 and the lens holder 9 being assembled, and FIG. 8 is an enlarged cross-sectional view taken along the arrow A-A line. Reference numeral 12 represents a double-faced adhesive tape, and reference numeral 13 represents a main substrate.

As shown in FIG. 7 and FIG. 8, the porous film 11 is attached with the double-faced adhesive tape 12 to the inner surface of the front case 3 in the area surrounding the ventilation hole 31, and the front surface surrounding the through-hole 91 of the lens holder 9 is in contact with the back surface of this porous film 11. In addition, a ventilation groove 92, which leads to the through-hole 91 air expanded by heat generated by various electronic components mounted on the main substrate 13 arranged next to the lens unit 8, is formed on the back surface of the lens holder 9.

Figure 9:
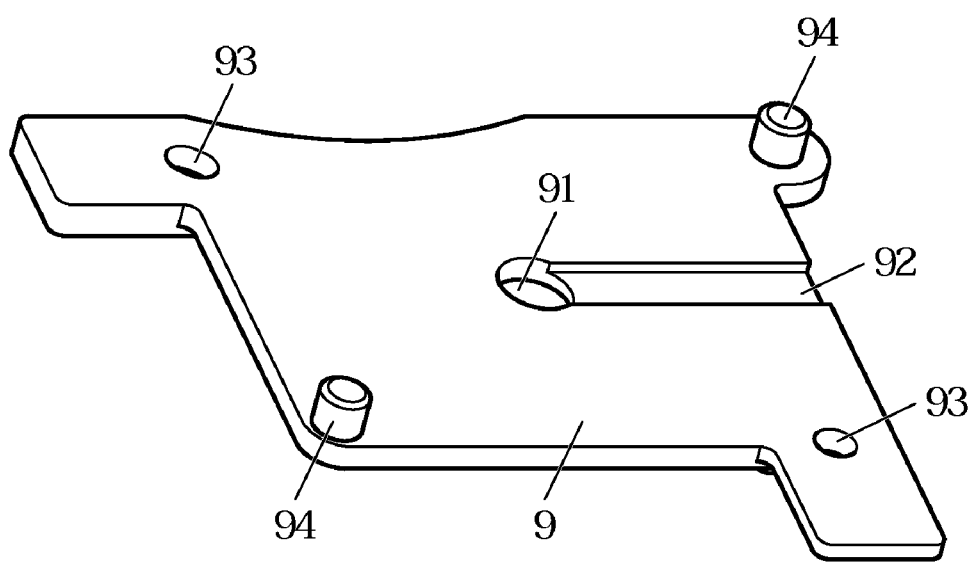
FIG. 9 is a diagram of the lens holder in FIG. 3 viewed from behind.
Figure 10C:
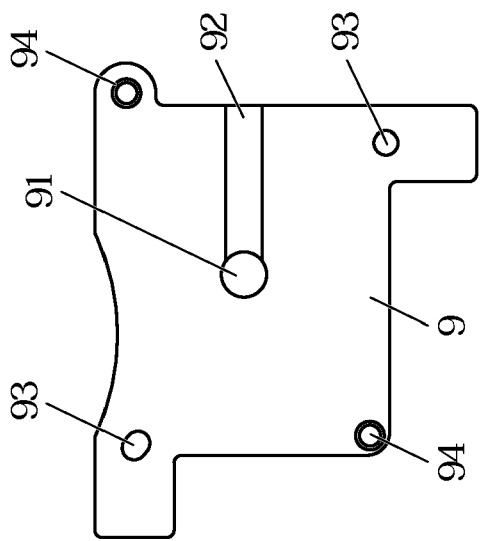
FIG. 10C is a rear view of the lens holder in FIG. 3.
Figure 10A:
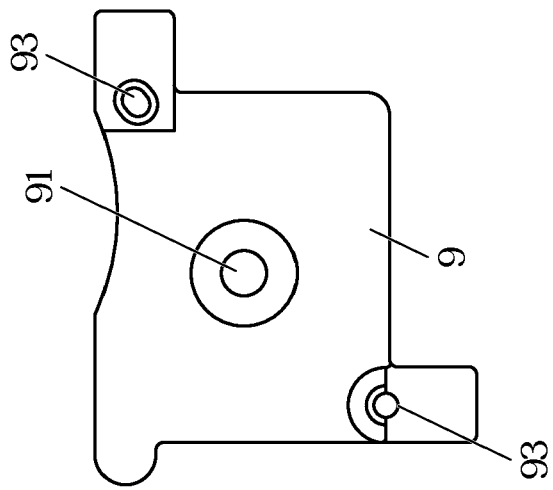
FIG. 10A is a front view of the lens holder in FIG. 3.
Figure 10B:
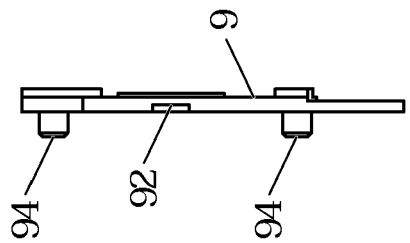
FIG. 10B is a side view of the lens holder in FIG. 3.

FIG. 9 is a perspective diagram of the lens holder 9 viewed from behind, and FIG. 10A, FIG. 10B, and FIG. 10C are respectively a front view, a side view, and a rear view of the lens holder 9. Reference numeral 93 represents a front case positioning hole, and reference numeral 94 represents a lens unit positioning pin.

On the lens holder 9, as shown in FIG. 9, FIG. 10A, FIG. 10B, and FIG. 10C, there are formed a pair of front case positioning holes 93 diagonally positioned with the through-hole 91 therebetween, and a pair of lens unit positioning pins 94 diagonally positioned on the other diagonal line in a manner to project towards the back surface. That is, positioning pins formed on the inner surface of the front case 3 are inserted into the front case positioning holes 93, and the lens unit positioning pins 94 are inserted into positioning holes formed on the front surface of the lens unit 8.

<Mounting of a Metal Frame>

Figure 11:
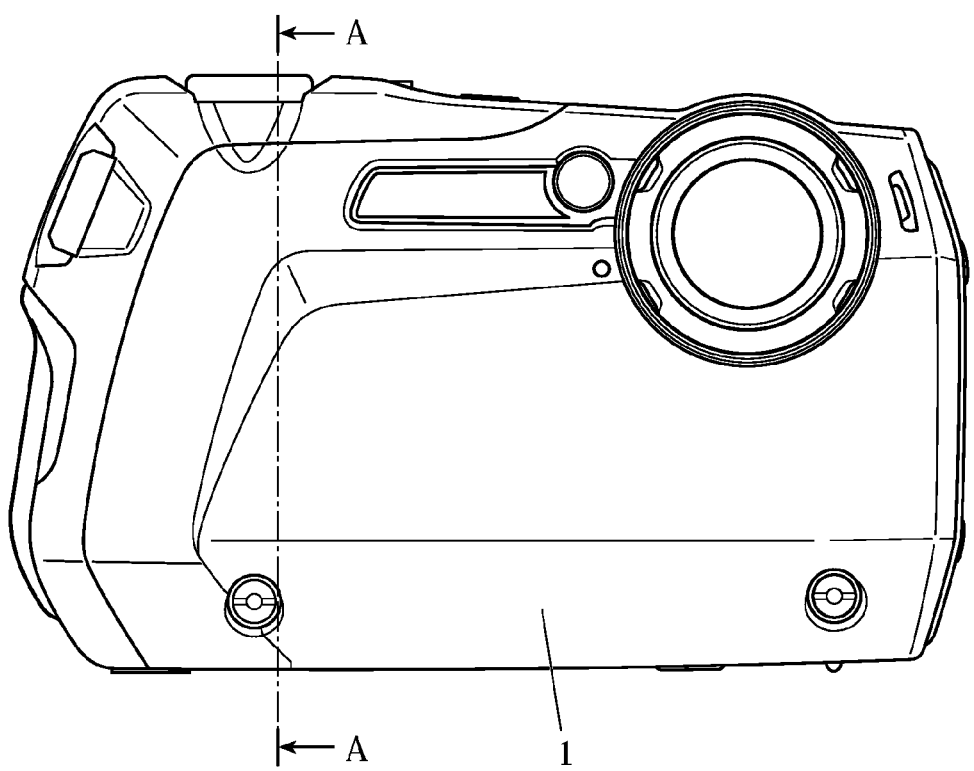
FIG. 11 is a front view of the waterproof camera in FIG. 1.
Figure 12:
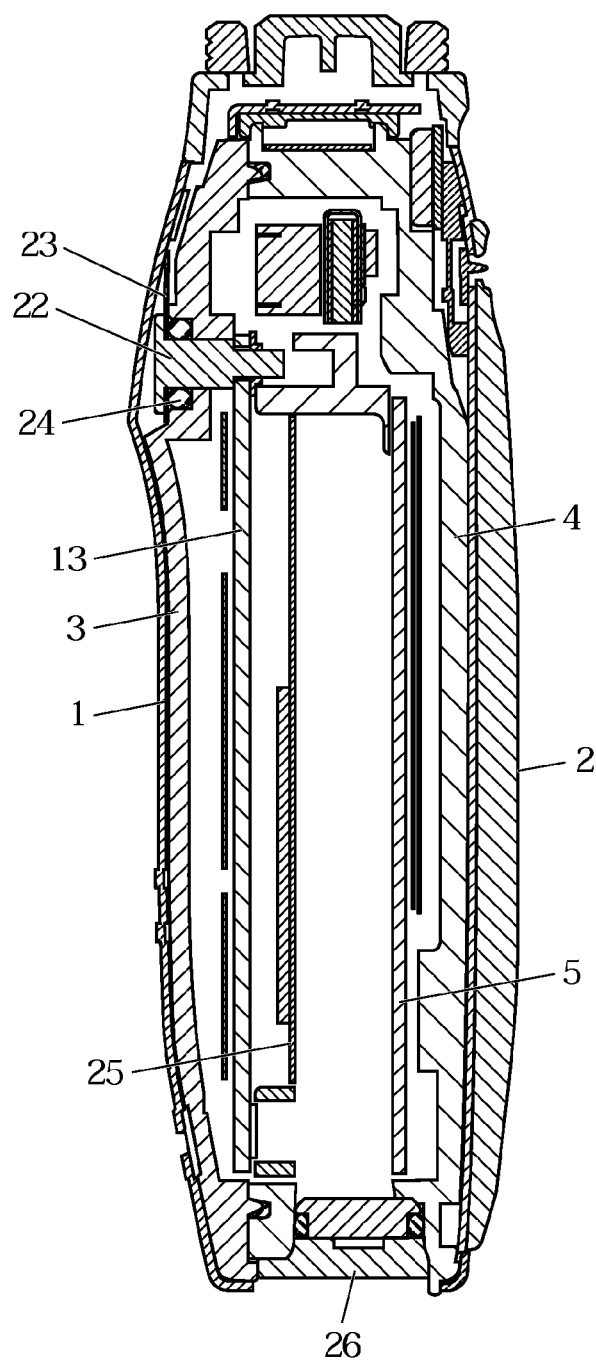
FIG. 12 is a cross-sectional view taken along the arrow A-A line in FIG. 5.

FIG. 11 is a front view of the waterproof camera, and FIG. 12 is a cross-sectional view taken along the arrow A-A line. Reference numeral 22 represents a step screw, and reference numeral 23 represents a grounding spring. In addition, reference numeral 24 represents a rubber gasket, and reference numeral 25 represents a battery box. Reference numeral 26 represents a battery cover.

As shown in FIG. 2 and FIG. 12, a hole 32 for running the ground (earth) of the circuit board (main substrate 13) directly to the outer panels is formed in the front case 3, and the step screw 22 is fastened and fixed to the main substrate 13 through this hole 32 with the grounding spring 23 and the rubber gasket 24 therebetween. The grounding spring 23 is held in contact with the inner surface of the front panel 1.

Figure 13B:
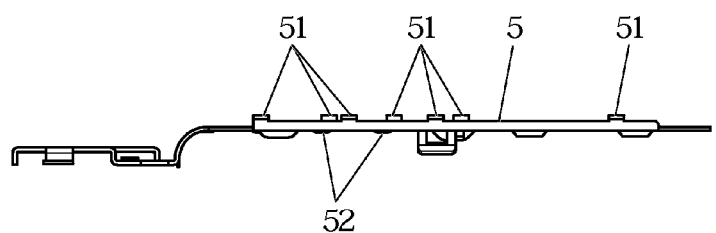
FIG. 13B is a top view of the metal frame in FIG. 3.
Figure 13A:
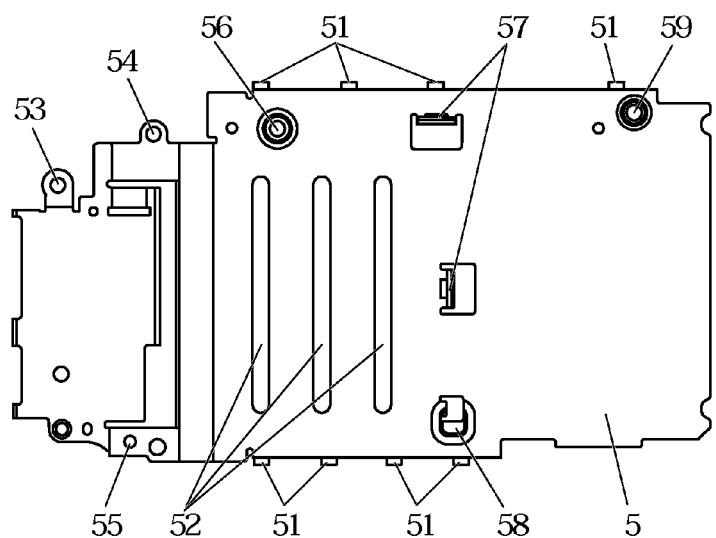
FIG. 13A is a front view of the metal frame in FIG. 3.
Figure 13C:
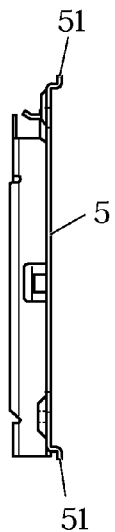
FIG. 13C is a side view of the metal frame in FIG. 3.
Figure 15A:
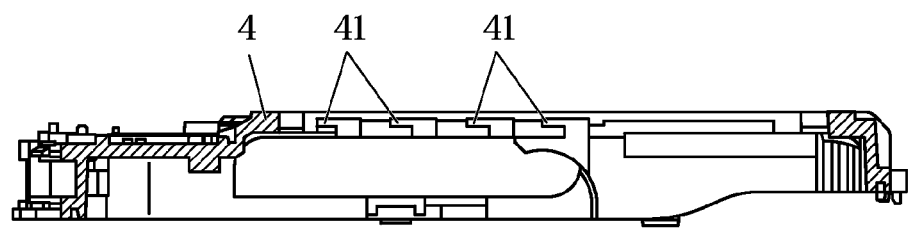
FIG. 15A is a cross-sectional view taken along the arrow A-A line in FIG. 14A.
Figure 15B:
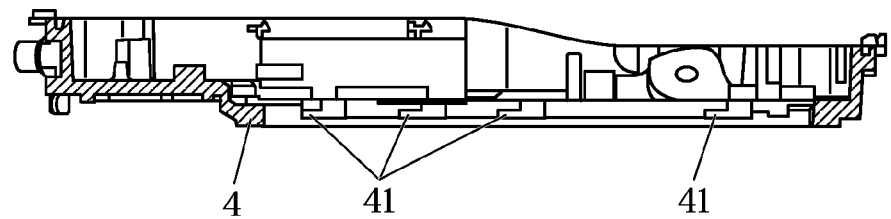
FIG. 15B is a cross-sectional view similarly taken along the arrow B-B line in FIG. 14A.

FIG. 13A to FIG. 13C are diagrams of the metal frame 5.

As shown in FIG. 13A to FIG. 13C, the metal frame 5 is a stainless steel plate, and the upper edge section and the lower edge section thereof are bent sections bent towards the back surface. A plurality (four in the drawings) of sliding tabs 51 that are formed at an interval and project upward along the upper edge section formed by the bent section is integrally formed in the metal frame 5. Similarly, a plurality (four in the drawings) of sliding tabs 51 that are formed at an interval and project downward along the lower edge section formed by the bent section is integrally formed in the metal frame 5.

Furthermore, a plurality (three in the drawings) of projecting guides 52 for guiding a rechargeable battery, a screw hole 53 for fixing the rear case 3, a screw hole 54 for fastening together the battery box 25 and the metal frame 5, a screw hole 55 for fastening together a sub-substrate 29 and the metal frame 5, a battery box positioning hole 56, two battery box fixing hooks 57 that project forward, a battery box fixing hole 58, and a lens temporary fixing hole 59 are formed in the metal frame 5.

FIG. 14A to FIG. 14C, and FIG. 15A and FIG. 15B are diagrams showing the rear case 4. A plurality (four in the drawings) of L-shaped sliding grooves 41 facing the same direction are formed at an interval on the inner surface of the upper edge section of the rear case 4, and these plurality (four in the drawings) of L-shaped sliding grooves 41 facing the same direction are also formed at an interval on the inner surface of the lower edge section.

The sliding grooves 41 on the upper edge section of the rear case 4, described above, correspond to the sliding tabs 51 on the upper edge section of the metal frame 5, and the sliding grooves 41 on the lower edge section of the rear case 4 correspond to the sliding tabs 51 on the lower edge section of the metal frame 5.

Furthermore, a display opening section 42, a screw boss 43 for fixing the metal frame 5, and a screw boss 44 for fixing the battery box 25 are formed in the rear case 4.

Figure 16A:
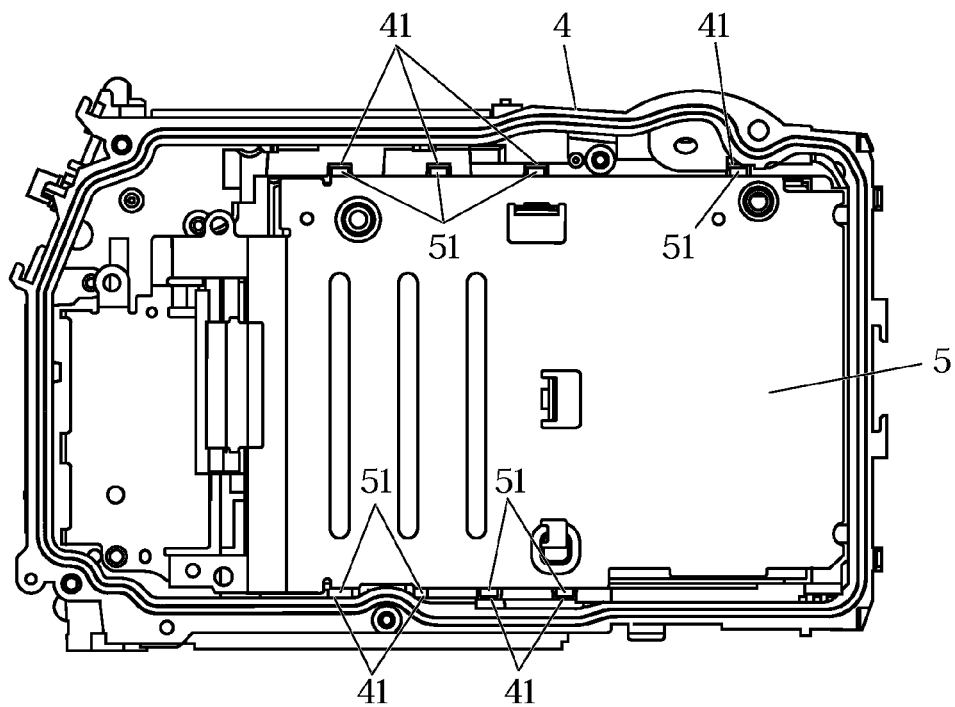
FIG. 16A is a diagram showing a state in which the metal frame has been mounted on the rear case.

FIG. 16A is a diagram showing the rear case 4a, in which the metal frame 5 has been mounted thereon. During assembly, first, the above-described LCD unit 6 is incorporated in the rear case 4. Then, as shown in FIG. 16A, the metal frame 5 is placed over the LCD unit 6 such that the sliding tabs 51 are respectively positioned at the entrances of the upper and lower sliding grooves 41.

Figure 16B:
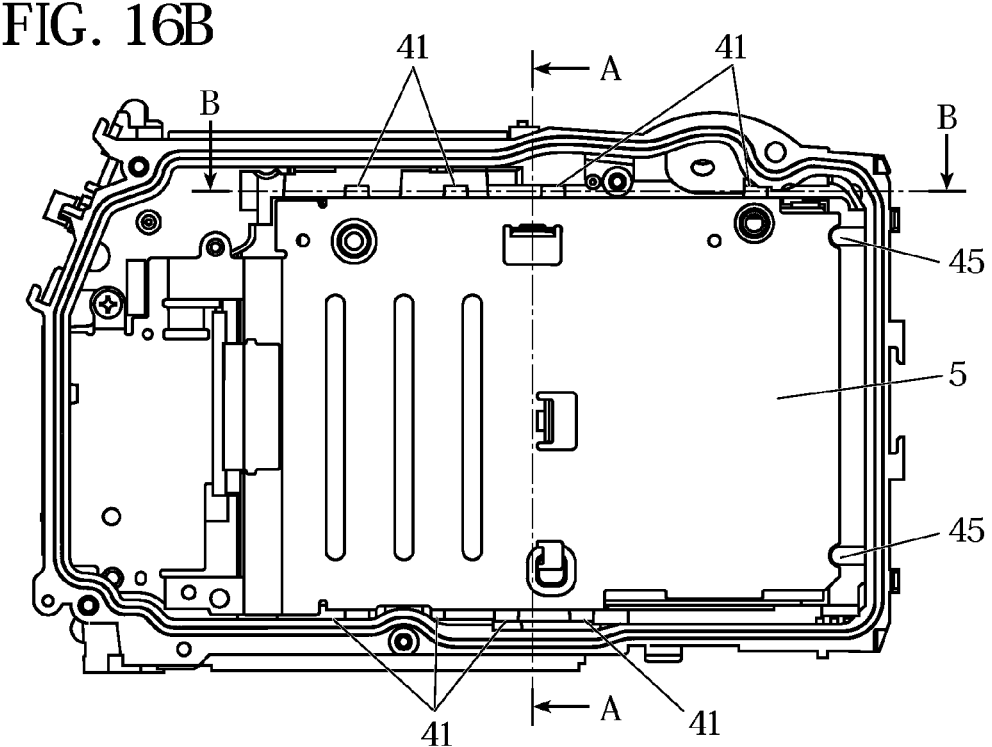
FIG. 16B is a diagram showing a state in which the metal frame has been slid leftward after the state shown in FIG. 16A.

Then, when the metal frame 5 is slid in the left direction in relation to the rear case 4, the sliding tabs 51 slide and move horizontally within the upper and lower sliding grooves 41, and the metal frame 5 engages with the rear case 4 as shown in FIG. 16B. At this time, upper and lower projecting stoppers 45 formed on the right edge section side in the rear case 4 are in contact with the right edge section of the metal frame 5. Therefore, the metal frame 5 is prevented from sliding in the direction in which the sliding tabs 51 detach from the sliding grooves 41, and thereby prevented from falling. In other words, a state in which the metal frame 5 has engaged with the rear case 4 is maintained.

Figure 18A:
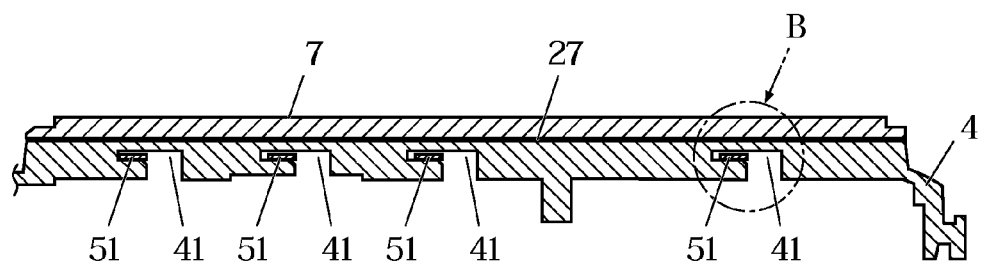
FIG. 18A is a cross-sectional view taken along the arrow B-B line in FIG. 16B.
Figure 18B:
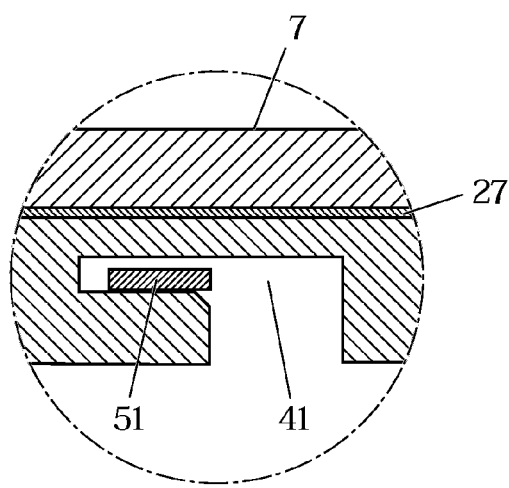
FIG. 18B is an enlarged view of the arrow B area in FIG. 18A.

FIG. 17A is a cross-sectional view taken along the arrow A-A line in FIG. 16B, and FIG. 17B is an enlarged view of the arrow B area. In addition, FIG. 18A is a cross-sectional view taken along the arrow B-B line in FIG. 16B, and FIG. 18B is an enlarged view of the arrow B area.

As shown in FIG. 17A, FIG. 17B, FIG. 18A, and FIG. 18B, the display plate 7 is attached to the outer surface surrounding the display opening section 42 of the rear case 4 by a double-face adhesive tape 27, and the metal frame 5 is placed over the back surface of the LCD unit 6 arranged in the display opening section 42. The sliding tabs 51 are positioned further back from the entrances of the sliding grooves 41.

Figure 19:
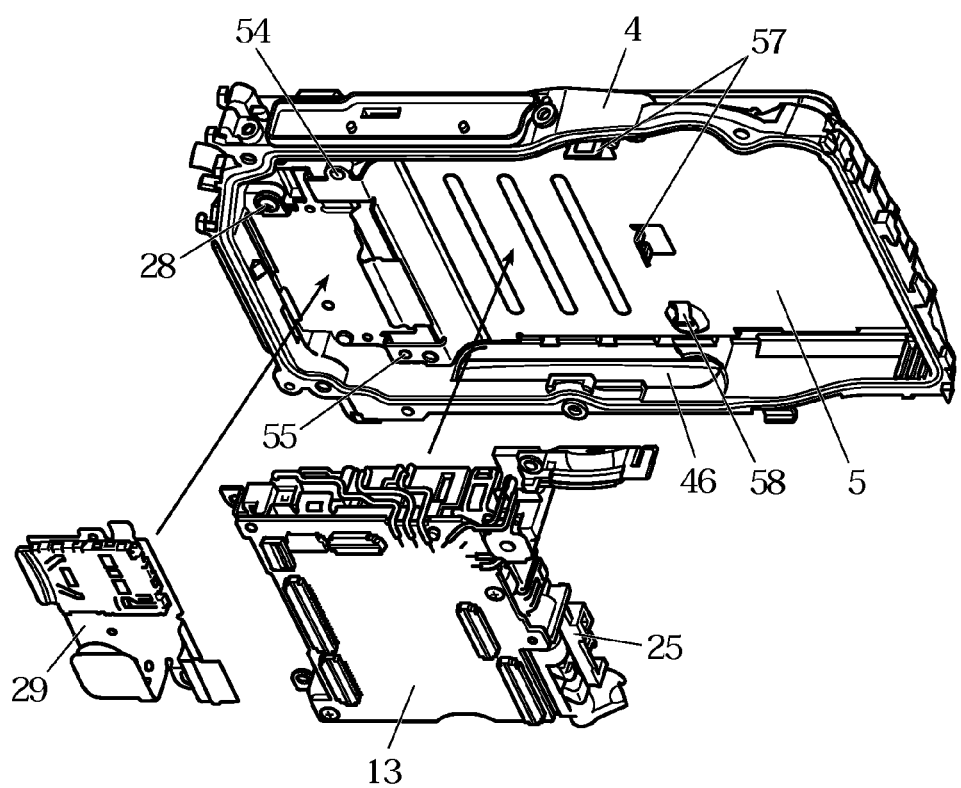
FIG. 19 is an exploded perspective view of the rear case, the battery box, and the sub-substrate of the electronic device.

FIG. 19 is an exploded view of the rear case 4, the battery box 25, and the sub-substrate 29. Reference numeral 46 represents a rechargeable battery insertion and removal opening.

As shown in FIG. 19, the metal frame 5 is fixed by a screw 28 being fastened to the screw boss 43 for fixing the metal frame 5 in the rear case 4 through the screw hole 53 for fixing the rear case 4.

Also, the battery box 25 onto which the main substrate 13 has been fastened by a screw is, after being positioned to the battery box positioning hole 56, fixed by the battery box fixing hook 57 and a backplate hook on the battery box 25 so as to ensure conductivity, and fixed to the battery box fixing hole 58. In addition, the metal frame 5 and the back plate of the battery box 25 are fastened together by a screw through the screw boss 44 for fixing the battery box 25 and the screw hole 54 for fastening together the battery box 25 and the metal frame 5, whereby conductivity is ensured.

Moreover, a sub-substrate 29 mounted with connectors is fastened together with the metal frame 5 by a screw through the screw hole 55 for fastening together the sub-substrate 29 and the metal frame 5, whereby conductivity is ensured.

Figure 20:
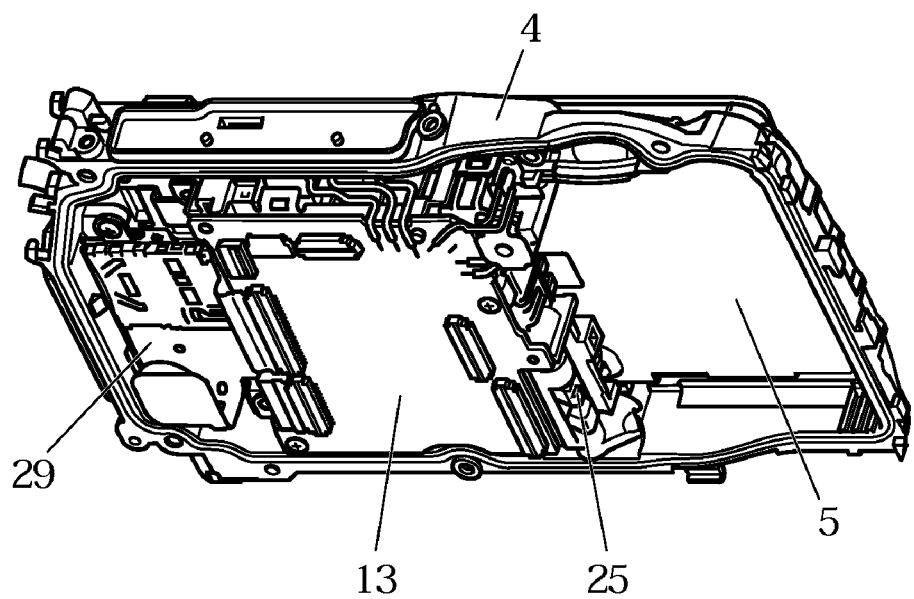
FIG. 20 is a diagram in which the battery box and the sub-substrate have been assembled in the rear case in FIG. 19.
Figure 21:
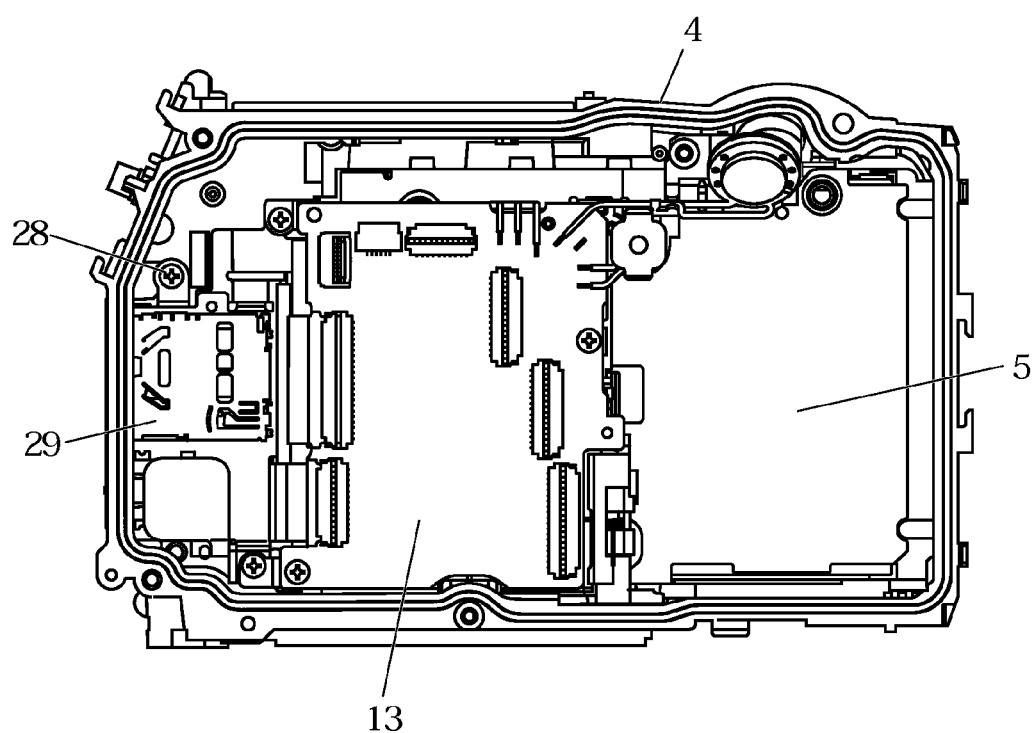
FIG. 21 is a front view of the assembled state in FIG. 20.

FIG. 20 is a diagram showing the battery box 25 and the sub-substrate 29 assembled in the rear case 4, and FIG. 21 is a front view thereof.

Thereafter, the lens unit 8 is temporarily fixed to the lens temporary fixing hole 59, and the front case 3 is fixed to the rear case 4 by being fastened by a screw via a gasket.

<Mounting of a Dial Section>

Figure 22:
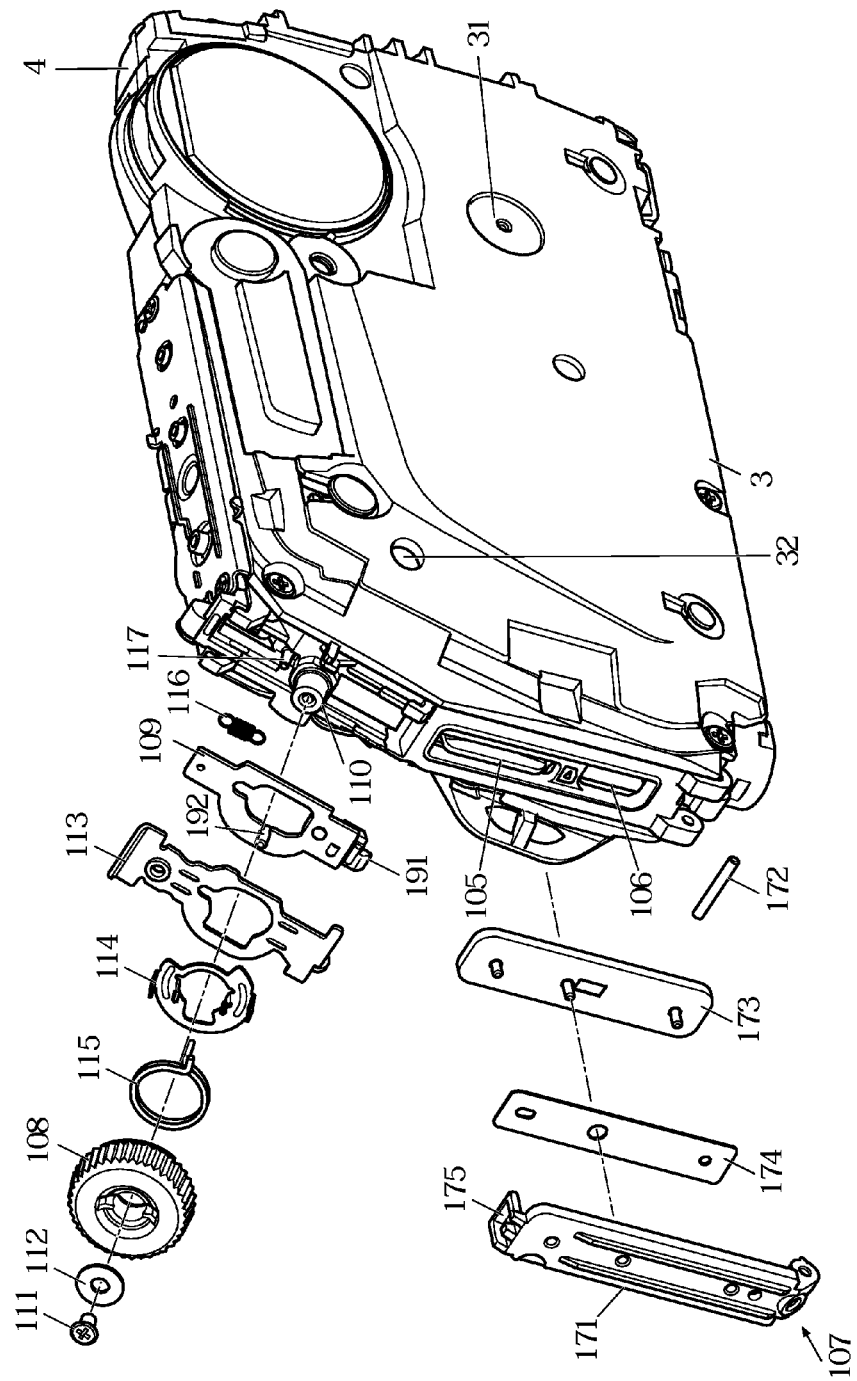
FIG. 22 is an enlarged exploded view of the housing and the cover member in FIG. 2, and a locking mechanism and a releasing mechanism thereof.
Figure 25:
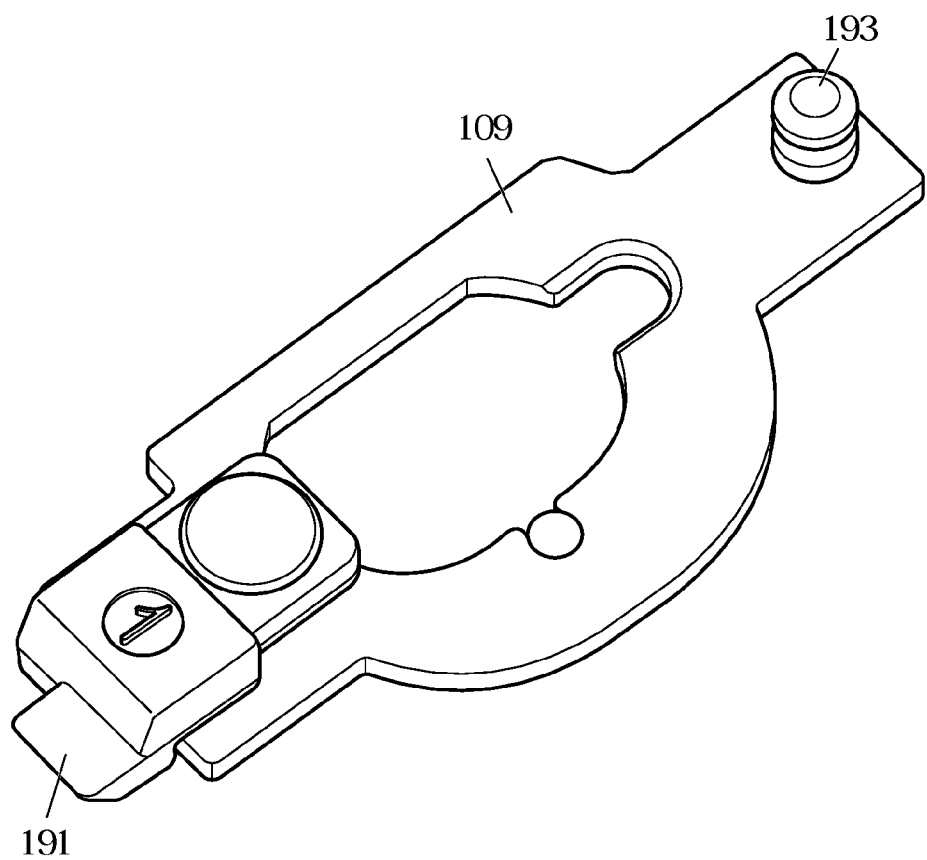
FIG. 25 is an enlarged view of the sliding member in FIG. 22 viewed from behind.

FIG. 22 is an enlarged exploded view of the housing, the cover member, and a locking mechanism and a releasing mechanism thereof. Reference numeral 105 represents a media card slot, reference numeral 106 represents a universal serial bus (USB) connector terminal, and reference numeral 107 represents a cover member. In addition, reference numeral 108 represents a dial, reference numeral 109 represents a sliding member, and reference numeral 111 represents a dial attaching screw. Moreover, reference numeral 112 represents a dial detachment stopping washer, reference numeral 113 represents a slide guiding plate, and reference numeral 114 represents a cover plate. Furthermore, reference numeral 115 represents a coil spring, and reference numeral 116 represents a spring.

As shown in FIG. 22, the media card slot 105 and the USB connector terminal 106 are formed on one side section of the housing constituted by the front case 3 and the rear case 4, such that their opening sections are aligned vertically. In addition, there is provided the cover member 107 which constitutes a cover for covering the media card slot 105 and the USB connector terminal 106. The dial 108 which is used to restrict the movement of the cover member 107 or to release this restriction by being rotated is provided above this cover member 107. Moreover, there is provided a sliding member 109 capable of engaging with the cover member 107 and locking the cover member 107 in a state of covering the media card slot 105 and the USB connector terminal 106 is provided.

That is, the cover member 107 is structured by the lower end section of a cover frame 171 being openably and closably attached to an area below the USB connector terminal 106 by a cover shaft 172. A cover rubber gasket 173 for waterproofing, which is to be in close contact with the surface surrounding the media card slot 105 and the USB connector terminal 106, is attached to the inner surface of this cover frame 171 by a double-faced adhesive tape 174, and an engaging groove 175 that is locked by the sliding member 109 is formed integrally in the upper end section of the cover frame 171.

The dial 108 is rotatably attached to an attaching boss 110 provided above the media card slot 105 on one side section of the housing (front case 3 and rear case 4) by the dial attaching screw 111 via the dial detachment stopping washer 112. As shown in FIG. 23, and FIG. 24A to FIG. 24C, an engaging tab 181 that engages with the sliding member 109 and a spring engaging section 182 are formed in the dial 108.

The sliding member 109, the slide guiding plate 113, the cover plate 114, and the coil spring 115 are stacked around the attaching boss 110. The sliding member 109 is held in a manner to be slidable in the up-down direction in relation to the slide guiding plate 113 that is engaged with and fixed at an area above the attaching boss 110 of the housing (front case 3 and rear case 4), and the cover plate 114 houses and holds the coil spring 115 in the dial 108. One end section of the coil spring 115 passes through a notch section in the cover plate 114, and is inserted into and fixed in an engaging section such as a hole formed near the attaching boss 110 of the housing (front case 3 and rear case 4). Also, the other end section is inserted into and engaged in the spring engaging section 182 in the dial 108.

As shown in FIG. 25, and FIG. 26A to FIG. 26C, a locking tab 191 that engages with the engaging groove 175 of the cover member 107 is fixed by a screw to the lower end section of the sliding member 109. On the sliding member 109, there are formed an engaging pin 192 projecting from the front surface of the intermediate section and a spring holding pin 193 projecting inwards from the upper end section, integrally. When the dial 108 is rotated, the engaging pin 192 engages with the engaging tab 181 in the dial 108. Also, the spring 116 is bridged between the spring holding pin 193 and a spring holding pin 117 provided above the attaching boss 110 in the housing (front case 3 and rear case 4).

In the structure above, as shown in FIG. 1, the upper and lower portions are hidden because of the shape of the outer panels (front panel 1 and rear panel 2), and as a result only the front and back portions of the dial 108 are exposed. Therefore, accidental operation can be prevented.

Figure 28A:
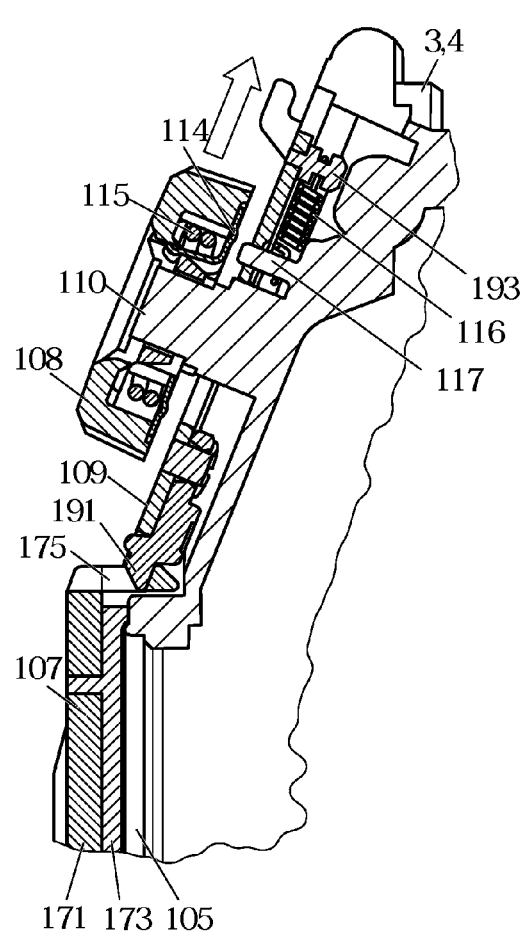
FIG. 28A is a cross-sectional view taken along the arrow A-A line in FIG. 27B, showing a cover member opening process 1.
Figure 28B:
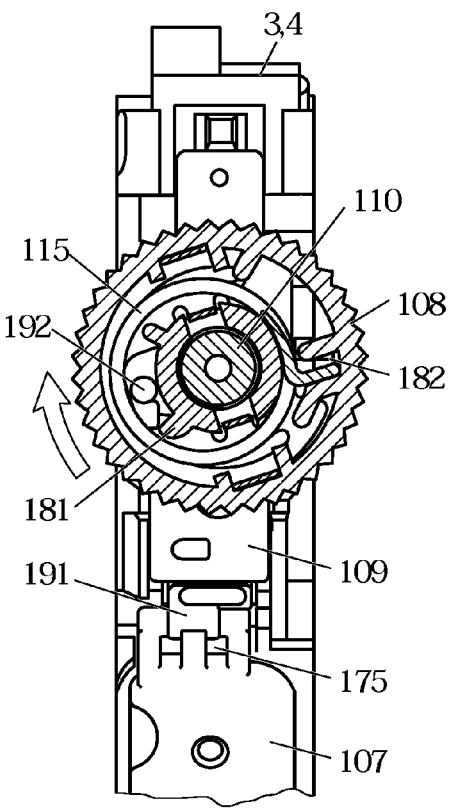
FIG. 28B is a cross-sectional view taken along the arrow B-B line in FIG. 27A, showing the cover member opening process 1.

Next, FIG. 27A is a front view of the housing, and FIG. 27B is a side view of the housing. In addition, FIG. 28A and FIG. 28B are diagrams showing a cover member 107 opening process 1 (start rotating dial). FIG. 28A is a cross-sectional view taken along the arrow A-A line in FIG. 27B, and FIG. 28B is a cross-sectional view similarly taken along the arrow B-B line in FIG. 27A.

As shown in FIG. 27A, FIG. 27B, FIG. 28A, and FIG. 28B, a locked state where the locking tab 191 of the sliding member 109 is engaged with the engaging groove 175 of the cover member 7 is maintained by the spring 116 that forces the sliding member 109 downward. In this locked state, the engaging tab 181 of the dial 108 is in a position downwardly away from the engaging pin 192 of the sliding member 109. Accordingly, in the locked state where the cover member 107 has been closed, there is play whose amount corresponds to the distance separating the engaging tab 181 and the engaging pin 192. As a result, the dial 108 is returned to the position shown in the drawings by a biasing force of the coil spring 115 even when the dial 108 is slightly rotated.

When the dial 108 is rotated in the clockwise direction as indicated by the arrow, the engaging tab 181 of the dial 108 comes into contact with the engaging pin 192 of the sliding member 109, and the sliding member 109 begins to slide upwards as indicated by the arrow.

Figure 29A:
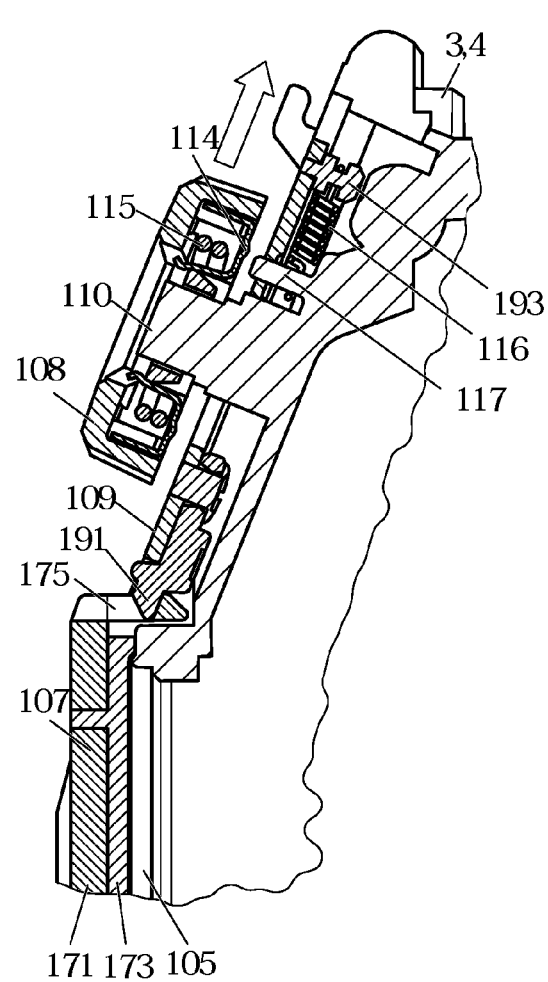
FIG. 29A is a cross-sectional view similar to FIG. 28A, showing a cover member opening process 2.
Figure 29B:
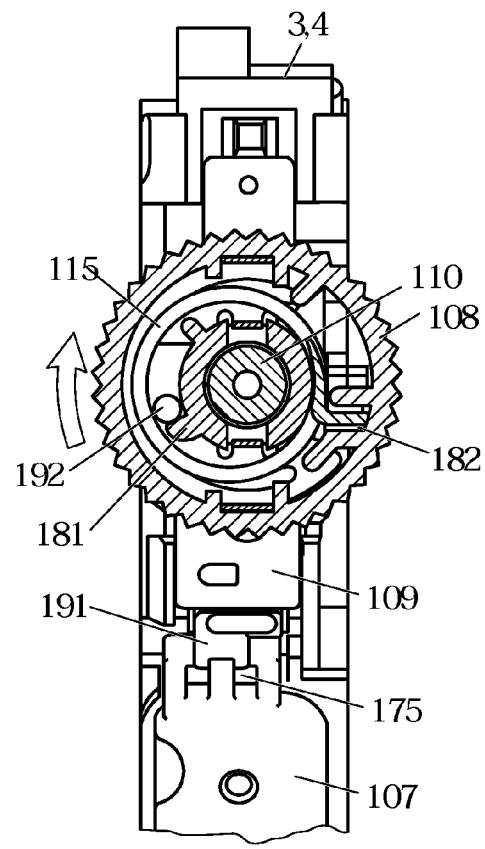
FIG. 29B is a cross-sectional view similar to FIG. 28B, showing the cover member opening process 2.

FIG. 29A and FIG. 29B are diagrams showing a cover member 107 opening process 2 (start interlocked sliding). As shown in the FIG. 29A and FIG. 29B, when the engaging tab 181 comes into contact with the engaging pin 192, the spring 116 bridged between the spring holding pin 193 of the sliding member 109 and the spring holding pin 117 of the housing begins to stretch, whereby the sliding member 109 begins to slide upwards.

Figure 30A:
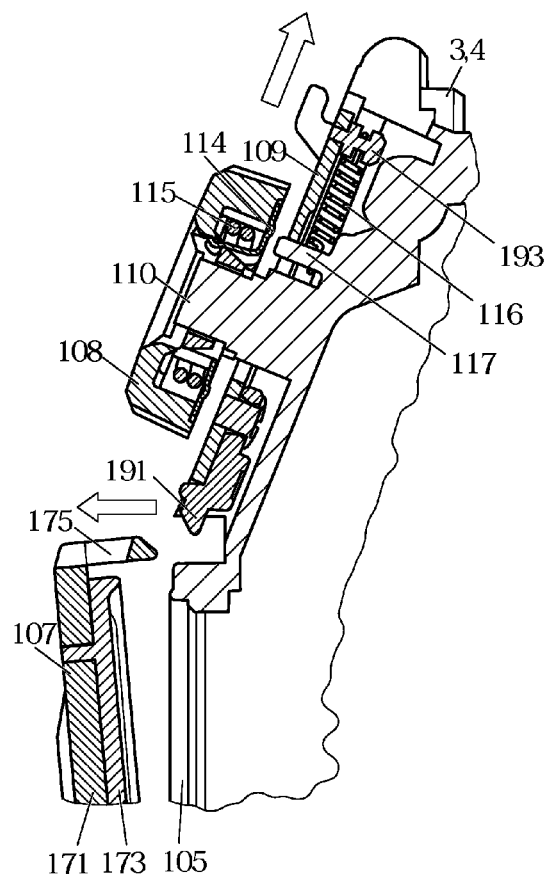
FIG. 30A is a cross-sectional view similar to FIG. 28A, showing a cover member opening process 3.
Figure 30B:
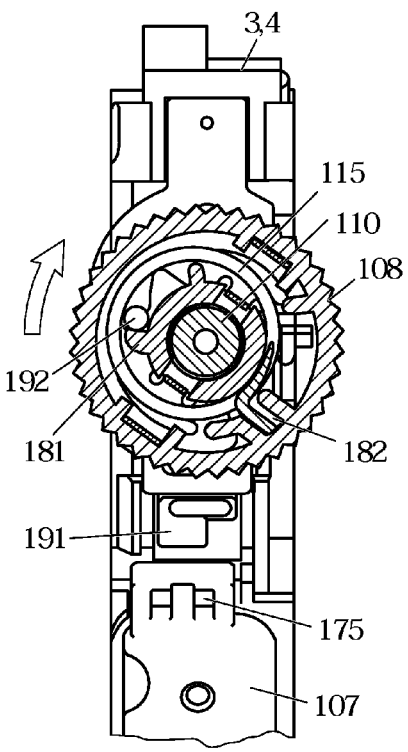
FIG. 30B is a cross-sectional view similar to FIG. 28B, showing the cover member opening process 3.

FIG. 30A and FIG. 30B are diagrams showing a cover member 107 opening process 3 (release cover lock). As shown in FIG. 30A and FIG. 30B, the engaging tab 181 pushes the engaging pin 192 upwards by the dial 108 being rotated, whereby the spring 116 is stretched, and the sliding member 109 slides upwards. As a result, the locking tab 191 of the sliding member 109 detaches from the engaging groove 175 of the cover member 107, and the lock is released. Accordingly, the cover member 107 swings with a cover shaft 172 below as a fulcrum by the elasticity of the cover rubber gasket 173, and as a result the media card slot 105 and the USB connector terminal 106 are opened.

In this way, the lock releasing mechanism is constituted by the engaging tab 181 provided in the dial 108, the engaging pin 192 provided in the sliding member 109, and the coil spring 115 that forces the dial 108 in a direction returning the dial 108 to its initial position.

Figure 31:
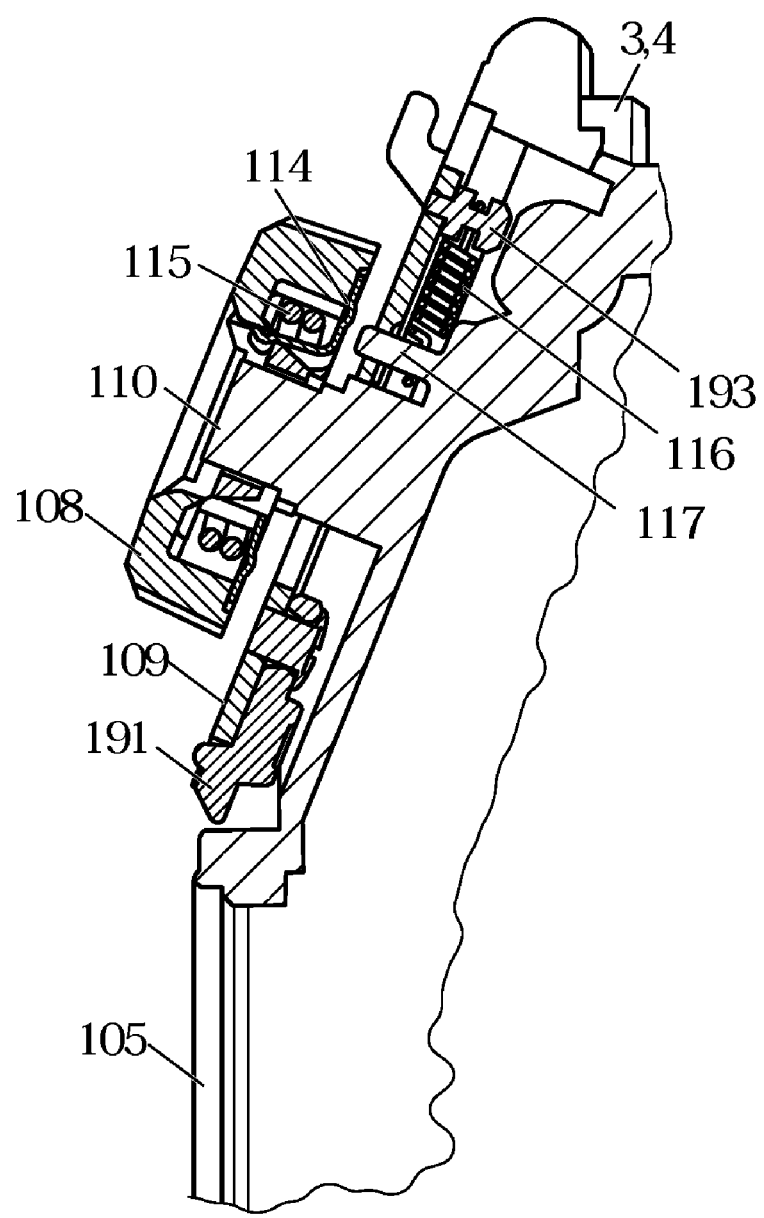
FIG. 31 is a cross-sectional view similar to FIG. 28A, showing a cover member closing process 1.

FIG. 31 is a diagram showing a cover member 107 closing process 1 (the start of the closing of the cover). The sliding member 109 is maintained in a state of being biased downward by the spring 116, and the dial 108 has been returned to its initial position by the biasing force of the coil spring 115. The user is able to close the cover member 107 from this state with a single touch.

Figures 32A, 32B:
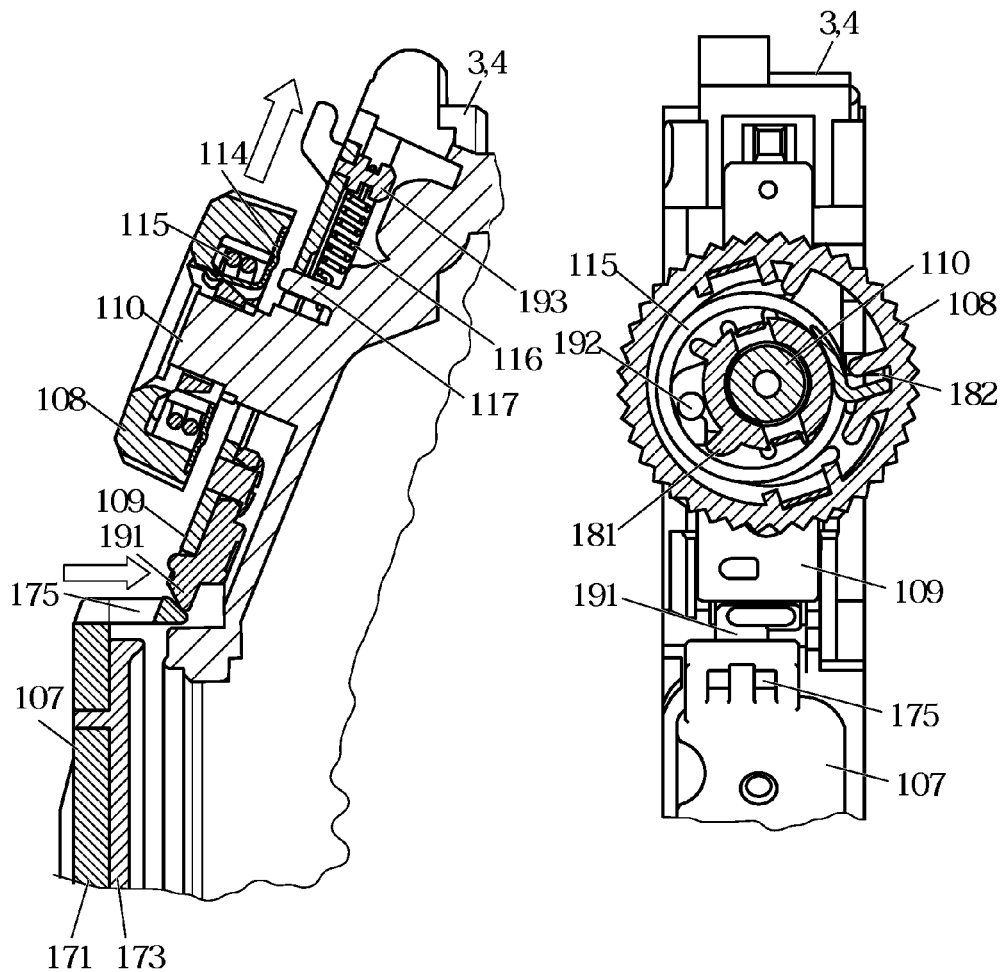
FIG. 32A is a cross-sectional view similar to FIG. 28A, showing a cover member closing process 2.
FIG. 32B is a cross-sectional view similar to FIG. 28B, showing the cover member closing process 2.

FIG. 32A and FIG. 32B are diagrams showing a cover member 107 closing process 2 (the start of interlocked sliding). As shown in FIG. 32A and FIG. 32B, the upper end section of the cover member 107 comes into contact with the locking tab 191 of the sliding member 109, whereby the spring 116 begins to stretch. As a result, the sliding member 109 begins to slide upwards.

Figure 33A:
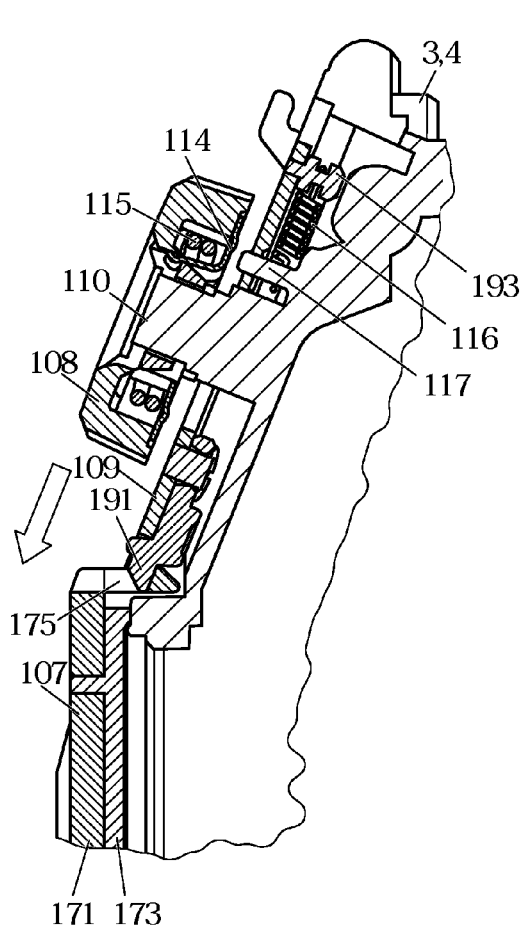
FIG. 33A is a cross-sectional view similar to FIG. 28A, showing a cover member closing process 3.
Figure 33B:
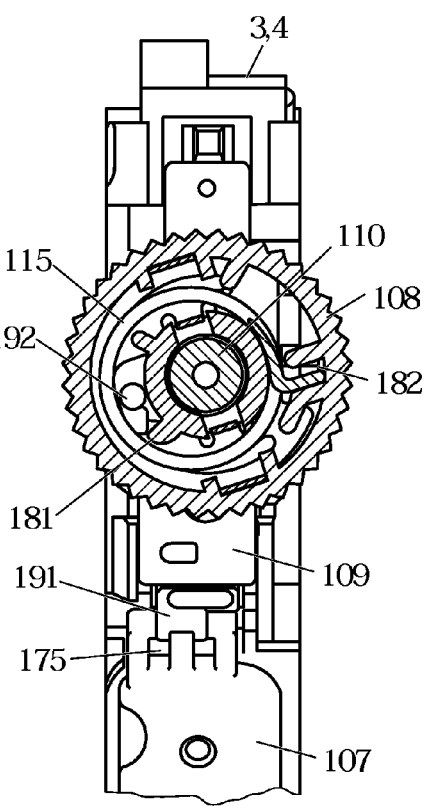
FIG. 33B is a cross-sectional view similar to FIG. 28B, showing the cover member closing process 3.

FIG. 33A and FIG. 33B are diagrams showing a cover member 107 closing process 3 (the locking of the cover). As shown in FIG. 33A and FIG. 33B, after moving past the upper end section of the cover member 107, the locking tab 191 enters a locked state where it is engaged with the engaging groove 175 of the cover member 107 by the urging force of the spring 116, and maintained therein.

In this way, the user is able to close the cover member 7 with a single touch.

As described above, in the waterproof camera with the structure of the embodiment, the porous film 11, which is attached by the double-faced adhesive tape 12 to the inner surface surrounding the ventilation hole 31 for adjusting the internal pressure of the front case 3, is supported by the lens unit 8 via the elastomer lens holder 9 and shock-absorbing member 10 mounted therebetween, as shown in FIG. 3, FIG. 5 and FIG. 6.

The back surface of the lens unit 8 is also structured to be supported by the strong metal frame 5 and the rear case 4 via the shock-absorbing members 10 therebetween.

As a result, the housing mounted with the lens unit 8 which is capable of withstanding internal pressure changes and ensuring shock-resistance while being waterproof and thin is achieved.

In addition, because the through-hole 91 and the ventilation groove 92 that leads air to the porous film 11 are formed in the lens holder 9, as shown in FIG. 7 and FIG. 8, the porous film 11 is capable of discharging air that expands with temperature rise caused by heat generated by various electronic components mounted on the main substrate 13 arranged next to the lens unit 8.

Moreover, in the structure of the embodiment, the sliding grooves 41 are formed in the rear case 4 housing the LCD unit 6, and the corresponding sliding tabs 51 are formed in the metal frame 5. The rear case 4 and the metal frame 5 are engaged by the sliding tabs 51 being slid into the sliding grooves 41. As a result, the rigidity of the rear case 4 having the large display opening section 42 can be significantly improved by the metal frame 5 having a large area and sufficient strength, and the assembly thereof can be simplified.

Accordingly, the housing mounted with the LCD unit 6 has advantages in that its shock-resistance performance can be ensured and its assembly can be facilitated, while being compact and thin.

Furthermore, as shown in the drawings, three projecting guides 52 for guiding a rechargeable battery are integrally formed on the metal frame 5. Therefore, a removable rechargeable battery that is housed in the battery box 25 of the housing can be easily inserted and removed along the three projecting guides 52 for guiding a rechargeable battery.

Still further, as also shown in the drawings, the two battery box fixing hooks 57 are integrally formed in the metal frame 5. Therefore, the main substrate 13 can be easily fixed to the two battery box fixing hooks 57, together with the battery box 25.

Yet still further, the metal frame 5 and the GND of the main substrate 13 are connected via the backplate of the battery box 25, and the metal frame 5 and the GND of the sub-substrate 29 are connected. As a result, its countermeasure for static electricity is reinforced.

Yet still further, the step screw 22 is fastened and fixed to the main substrate 13 through the hole 32 in the front case 3, with the grounding spring 23 and the rubber gasket 24 therebetween. This grounding spring 23 is in contact with the inner surface of the front panel 1. As a result, the ground (earth) of the main substrate 13 can be run directly to the front panel 1.

Yet still further, the waterproof camera according to the embodiment includes the sliding member 109 which is capable of locking the cover member 107 to cover the opening section (media card slot 105 and USB connector terminal 106) of the housing (front case 3 and rear case 4), the dial 108 which is used to restrict the movement of the cover member 107 or to release this restriction by being rotated, and the lock releasing mechanism (engaging tab 181 of the dial 108 and engaging pin 192 of the sliding member 109) which releases the locked state in which the opening section is covered by the cover member 107, by engaging the dial 108 with the sliding member 109 in response to the dial 108 being rotated by a predetermined angle or more, and by sliding the sliding member 109. Therefore, the dial-lock-type cover member 107 can be infallibly locked, and the user can easily perform opening and closing operations.

Variation Examples

In the above-described embodiment, the present invention has been applied to a camera. However, the present invention is not limited thereto. The present invention may be applied to other devices, such as a mobile phone including a camera.

Also, the shapes and the like of the housing, the lens unit, the porous film, the elastic member, the ventilation hole, the through-hole, and the ventilation groove may be discretionarily changed, and the specific structural details and the like may be changed accordingly.

In addition, the shapes and the like of the housing (resin case), the display, the metal frame, and the sliding groove may also be discretionarily changed, and the specific structural details, such as the shapes and the like of the sliding tab, the projecting guide, and the attaching section, may be changed accordingly.

Moreover, the shapes and the like of the housing, the opening section, the cover member, the dial, and the sliding member may also be discretionarily changed, and the specific structural details, such as the structure of the lock releasing mechanism, may be changed accordingly.

While the present invention has been described with reference to the preferred embodiments, it is intended that the invention be not limited by any of the details of the description therein but includes all the embodiments which fall within the scope of the appended claims.

What is claimed is:

1. A housing structure comprising:
   a lens unit that is mounted in a housing;
   a porous film that is attached to an inner surface toward a ventilation hole formed in the housing; and
   an elastic member that is interposed between the lens unit and the porous film.

2. The housing structure according to claim 1, further comprising:
   a shock-absorbing member that is interposed between the housing and the lens unit;
   wherein the elastic member is a lens holder that is interposed between the porous film and a portion of the shock-absorbing member.

3. The housing structure according to claim 1, wherein the elastic member has a through-hole in an area corresponding to the ventilation hole in the housing.

4. The housing structure according to claim 3, wherein the elastic member has formed therein a ventilation groove for leading air expanded by heat generation in the housing to the through-hole.

5. The housing structure according to claim 1, wherein the housing includes a resin case and a metal frame for preventing deformation of the resin case, and a sliding groove with which the metal frame is engaged by being slid is formed in an inner section of the resin case.

6. The housing structure according to claim 5, wherein the metal frame has formed therein a sliding tab corresponding to the sliding groove.

7. The housing structure according to claim 5, wherein the metal frame has a projecting guide formed integrally therein that guides insertion and removal of a removable rechargeable battery housed in the housing.

8. The housing structure according to claim 5, wherein the metal frame has an attaching section formed integrally therein that fixes a circuit board mounted in the housing.

9. The housing structure according to claim 1, further comprising:
   an opening section that is provided in the housing
   a cover member that movably covers the opening section;
   a dial that restricts movement of the cover member or releases the restriction by being rotated;
   a sliding member that is capable of engaging with the cover member and locking the cover member in a locked state where the opening section is covered by the cover member; and
   a lock releasing mechanism that engages the dial with the sliding member by the dial being rotated by a predetermined angle or more, and releases the locked state where the opening section is covered by the cover member, by sliding the sliding member.

10. The housing structure according to claim 9, wherein the lock releasing mechanism includes an engaging tab provided in the dial, and an engaging pin provided in the sliding member.

11. The housing structure according to claim 9, wherein the lock releasing mechanism includes a spring member that forces the dial in a direction in which the dial returns to an initial position.

12. The housing structure according to claim 9, wherein the lock releasing mechanism includes a spring member that forces the sliding member in a direction in which the sliding member engages with the cover member.

13. An electronic device having a housing with the structure according to claim 1.

* * * * *